April 29, 1924.

W. C. HUGULEY ET AL 1,491,861

MACHINE FOR MAKING THE SOCKET MEMBERS OF SNAP BUTTONS

Filed Sept. 22, 1916   21 Sheets-Sheet 1

Inventors
Wm C. Huguley
and
Wm Nelson
By their Attorneys
Baldwin Wight

April 29, 1924. 1,491,861
W. C. HUGULEY ET AL
MACHINE FOR MAKING THE SOCKET MEMBERS OF SNAP BUTTONS
Filed Sept. 22, 1916 21 Sheets-Sheet 4

Inventors:
W<u>m</u> C. Huguley and
W<u>m</u> Nelson.
By their Attorneys:
Baldwin Wight April 29, 1924.
W. C. HUGULEY ET AL
1,491,861
MACHINE FOR MAKING THE SOCKET MEMBERS OF SNAP BUTTONS
Filed Sept. 22, 1916     21 Sheets-Sheet 5
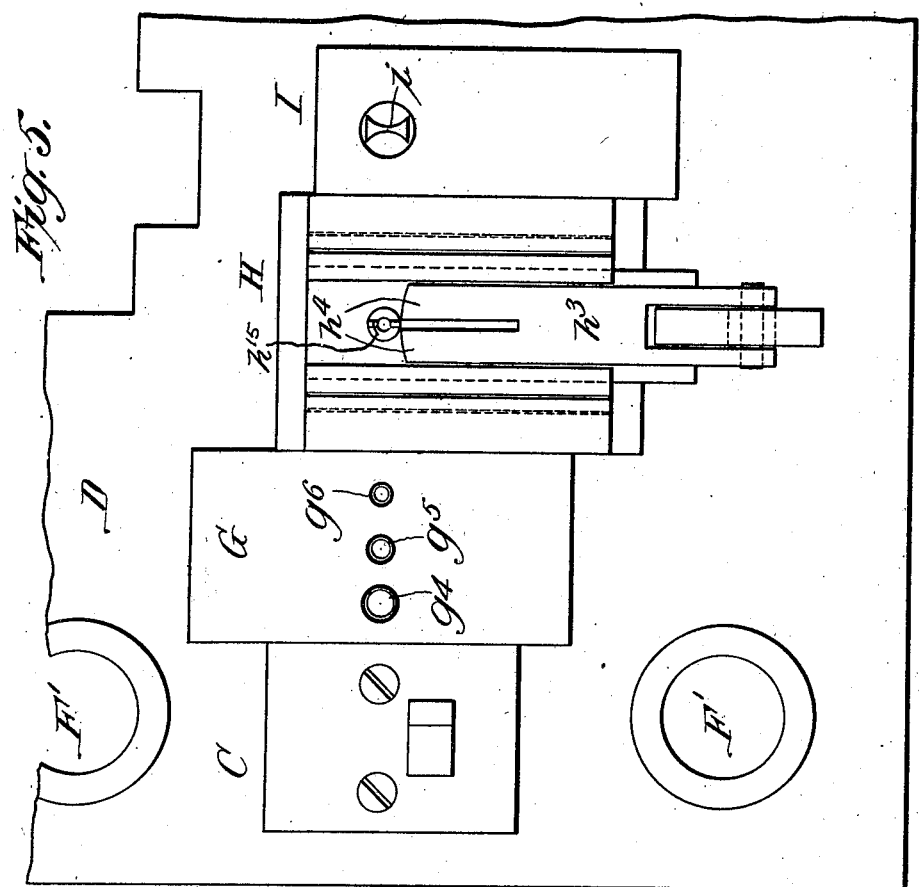
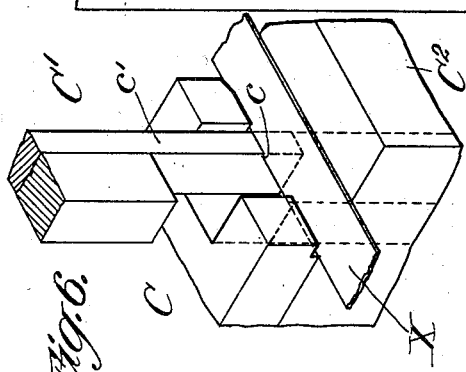
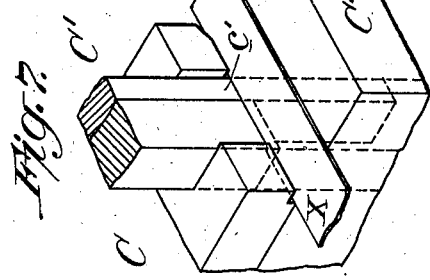

April 29, 1924.
W. C. HUGULEY ET AL
1,491,861
MACHINE FOR MAKING THE SOCKET MEMBERS OF SNAP BUTTONS
Filed Sept. 22, 1916   21 Sheets-Sheet 6
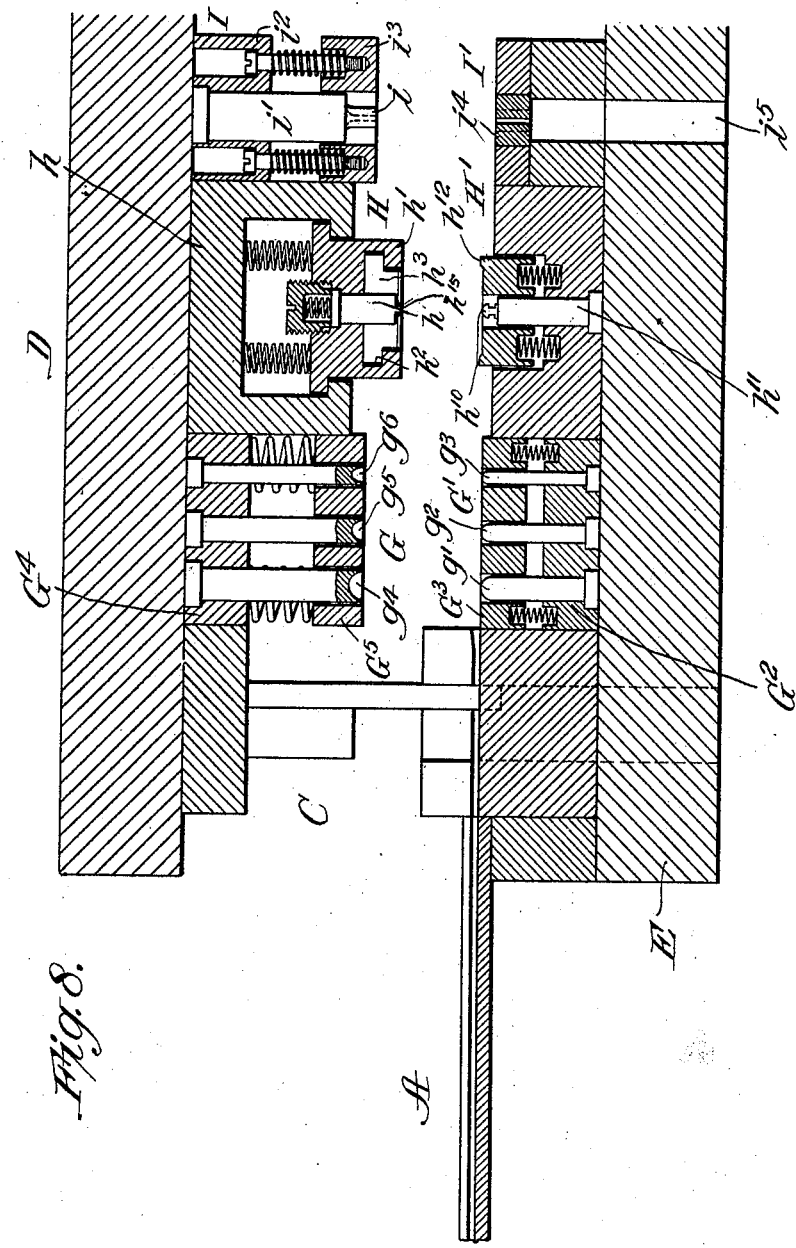

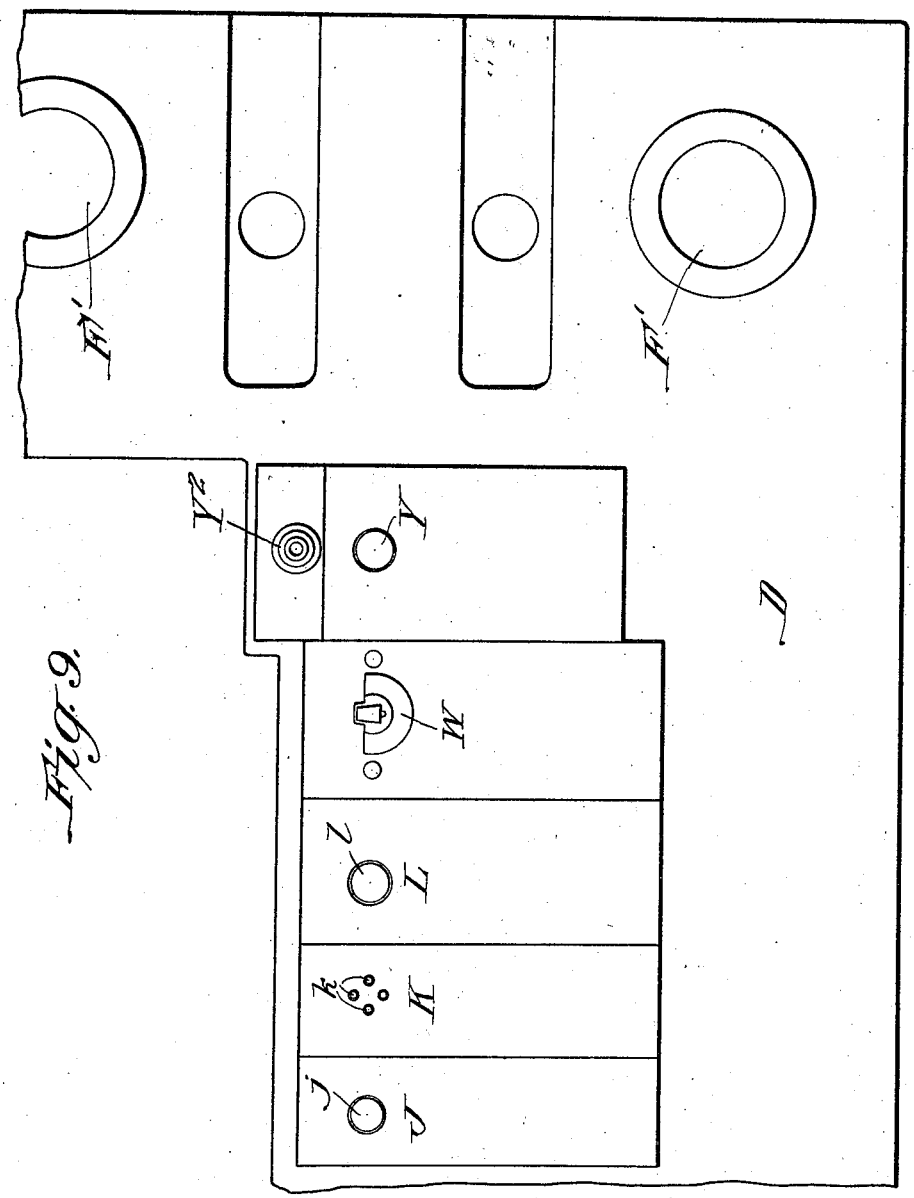

April 29, 1924.
W. C. HUGULEY ET AL
1,491,861
MACHINE FOR MAKING THE SOCKET MEMBERS OF SNAP BUTTONS
Filed Sept. 22, 1916 21 Sheets-Sheet 8
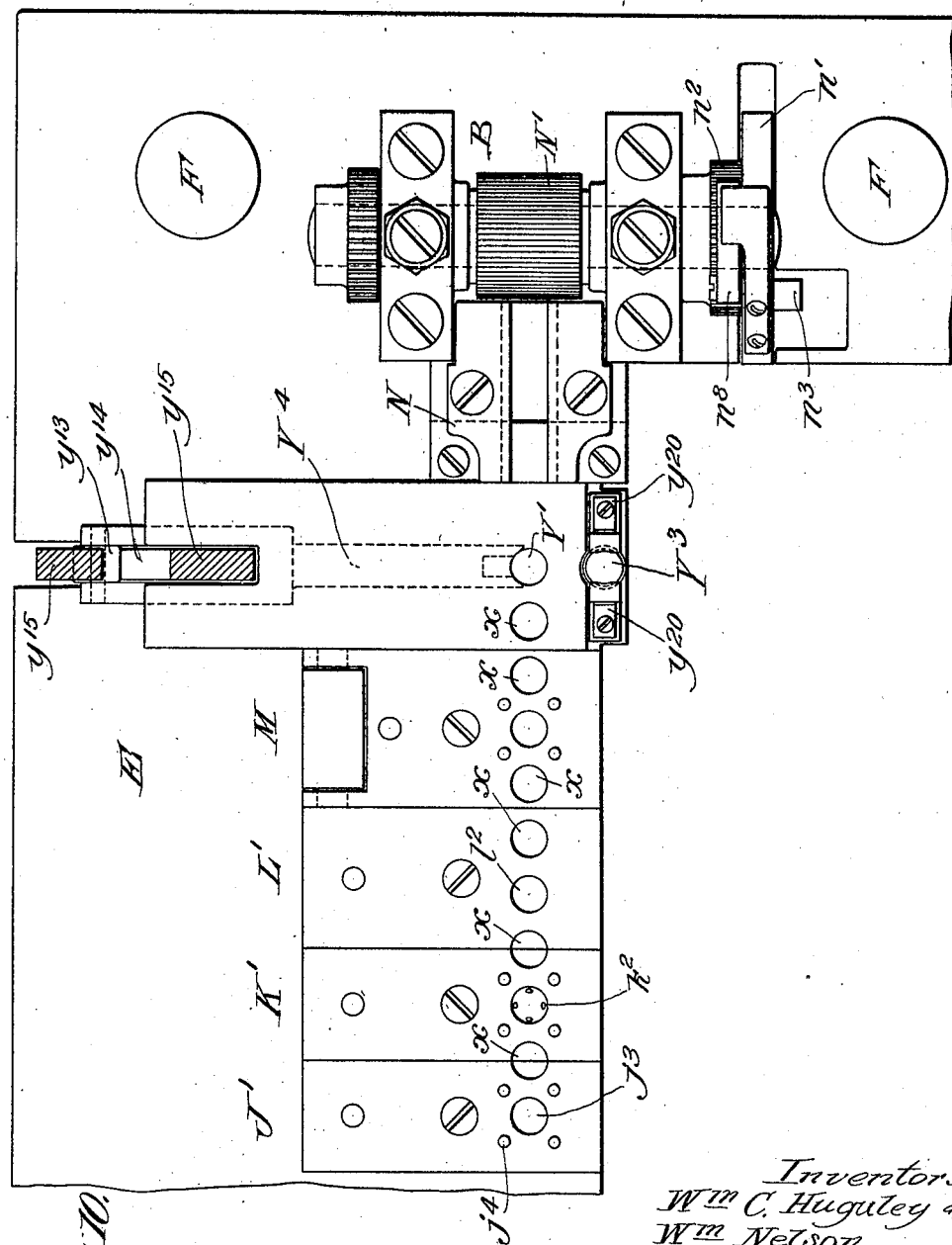

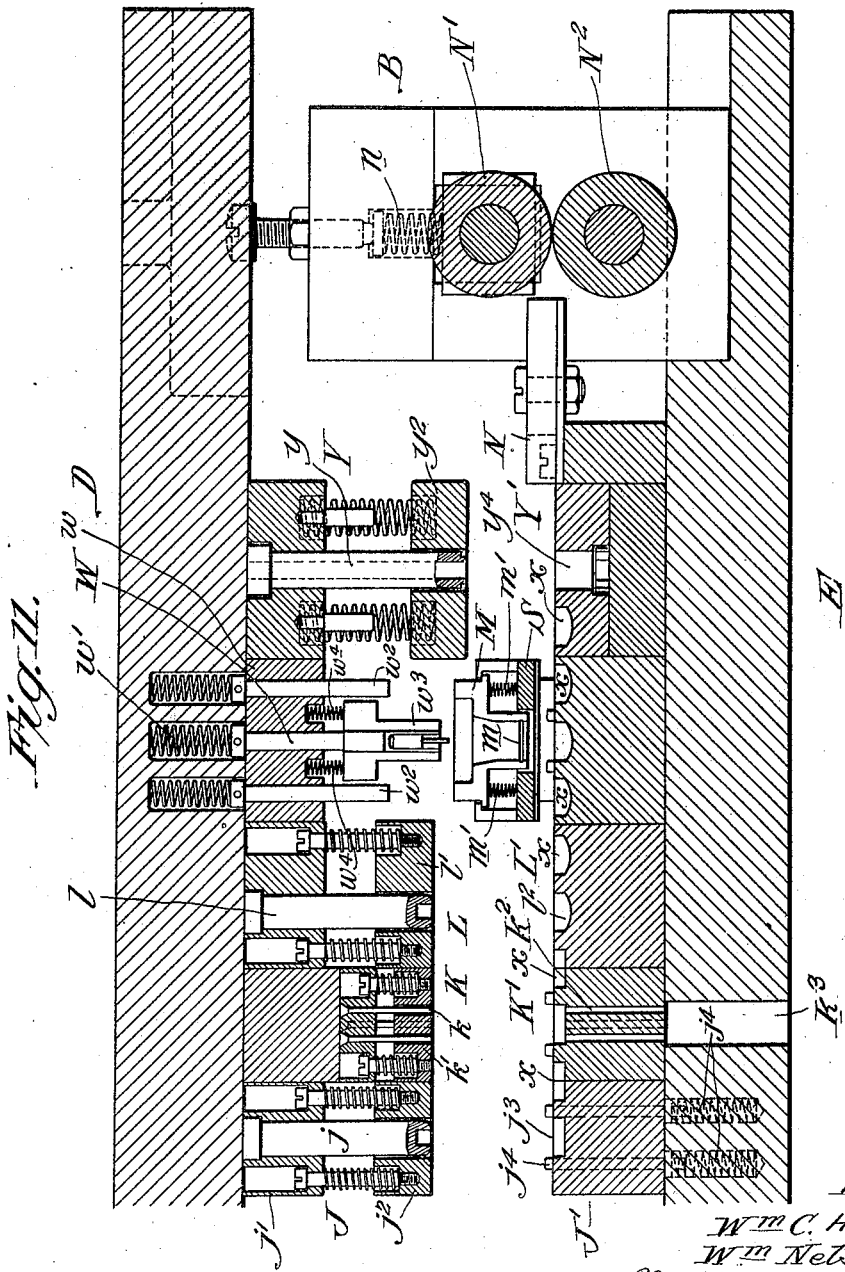

April 29, 1924.
W. C. HUGULEY ET AL
1,491,861
MACHINE FOR MAKING THE SOCKET MEMBERS OF SNAP BUTTONS
Filed Sept. 22, 1916   21 Sheets-Sheet 10
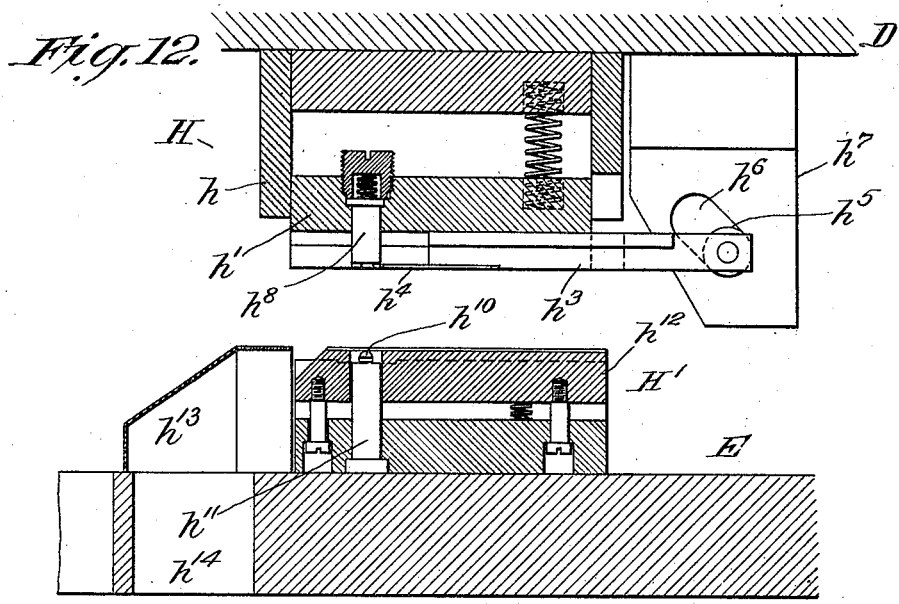
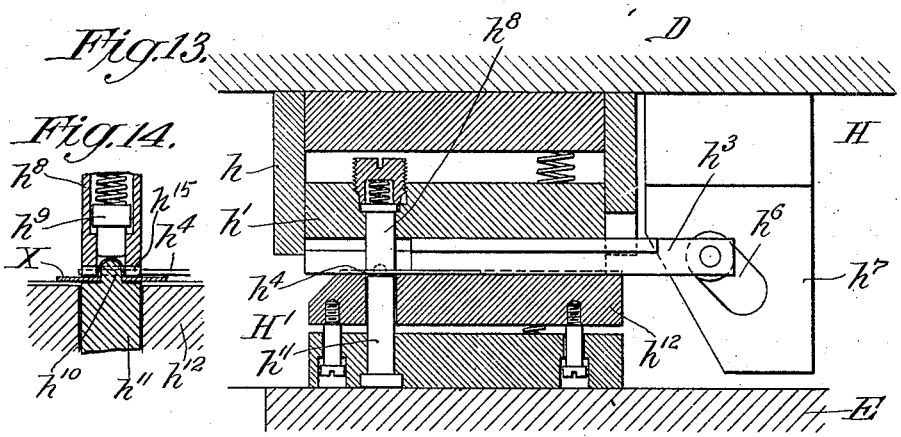
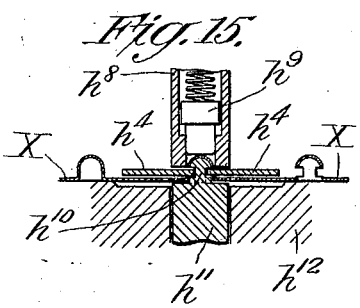
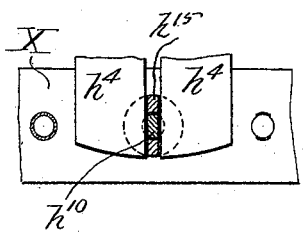
Inventors:
W<sup>m</sup> C. Huguley and
W<sup>m</sup> Nelson.
By their Attorneys:
Baldwin & Wight April 29, 1924.
W. C. HUGULEY ET AL
1,491,861
MACHINE FOR MAKING THE SOCKET MEMBERS OF SNAP BUTTONS
Filed Sept. 22, 1916    21 Sheets-Sheet 11
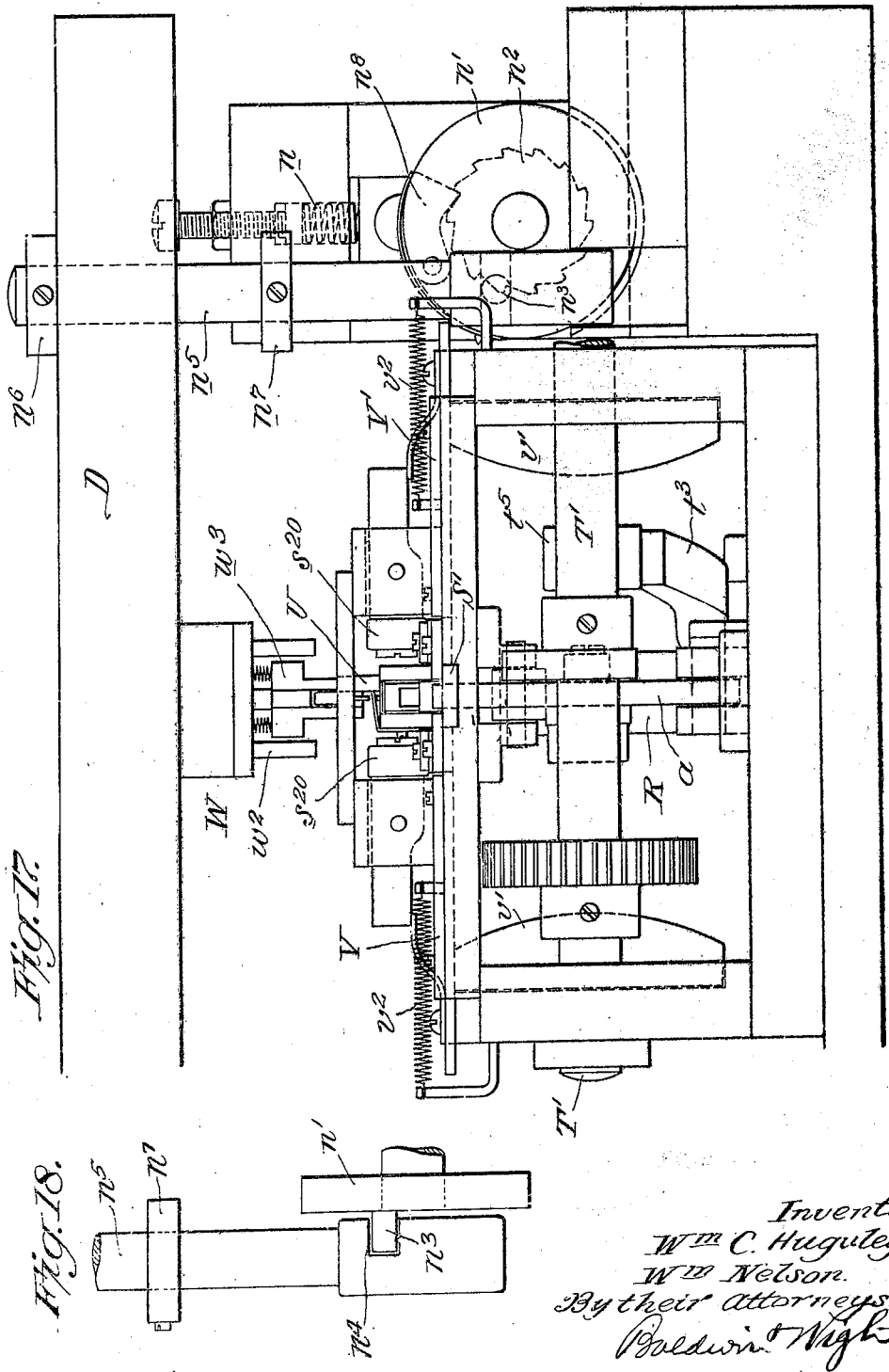
Inventors:
W<sup>m</sup> C. Huguley and
W<sup>m</sup> Nelson.
By their Attorneys:
Baldwin Wight

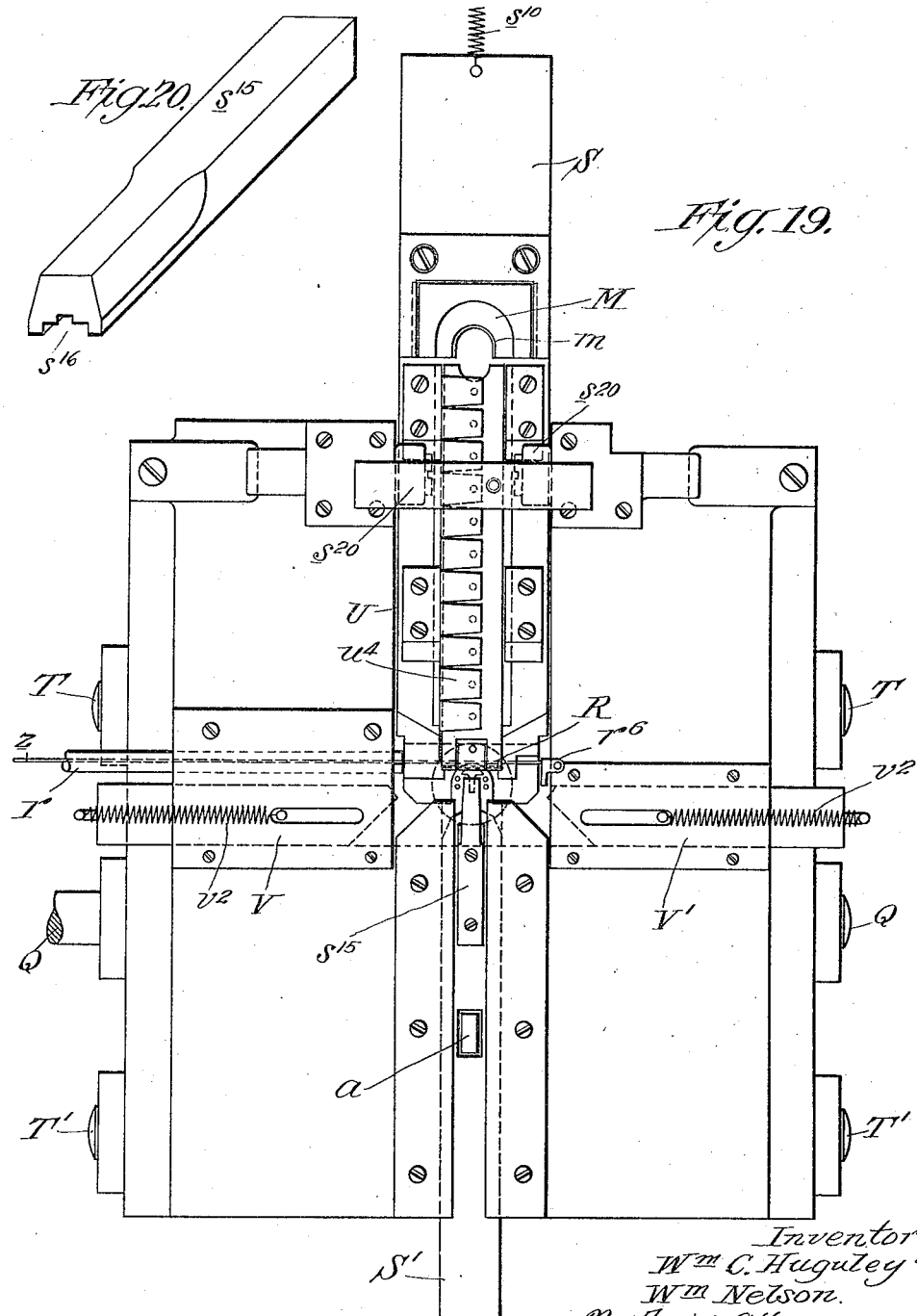

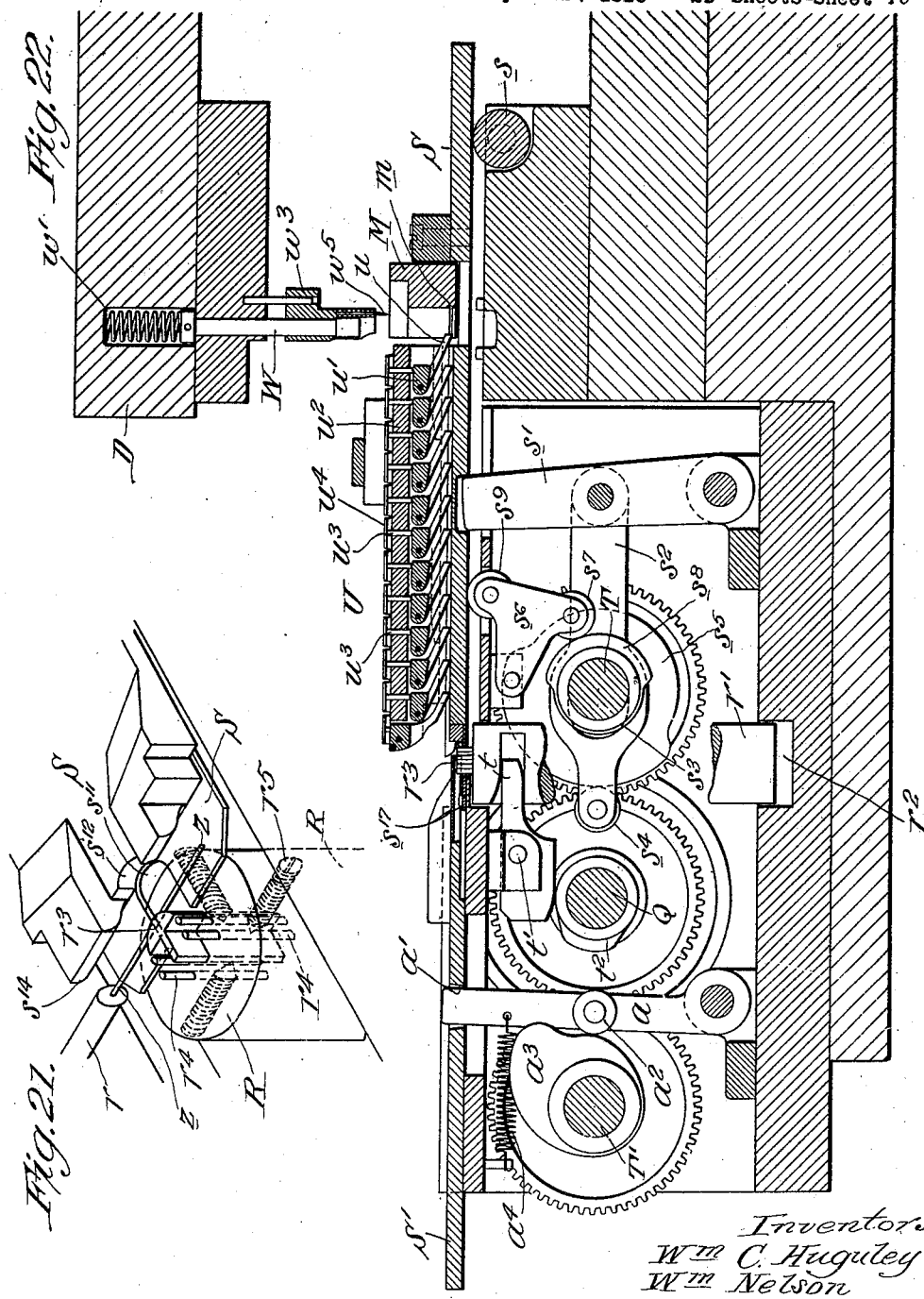

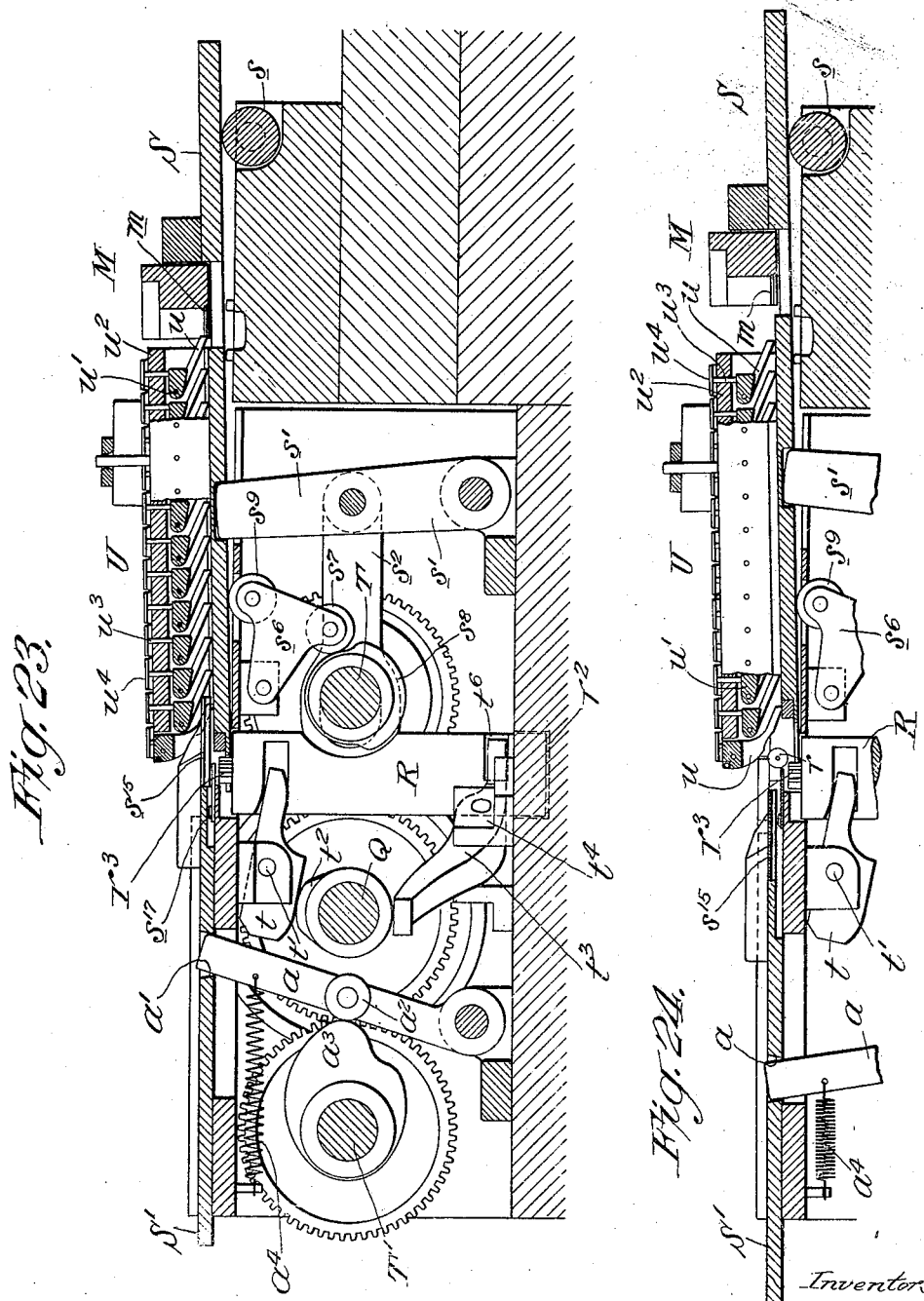

April 29, 1924.  
W. C. HUGULEY ET AL  
1,491,861  
MACHINE FOR MAKING THE SOCKET MEMBERS OF SNAP BUTTONS  
Filed Sept. 22, 1916  21 Sheets-Sheet 15
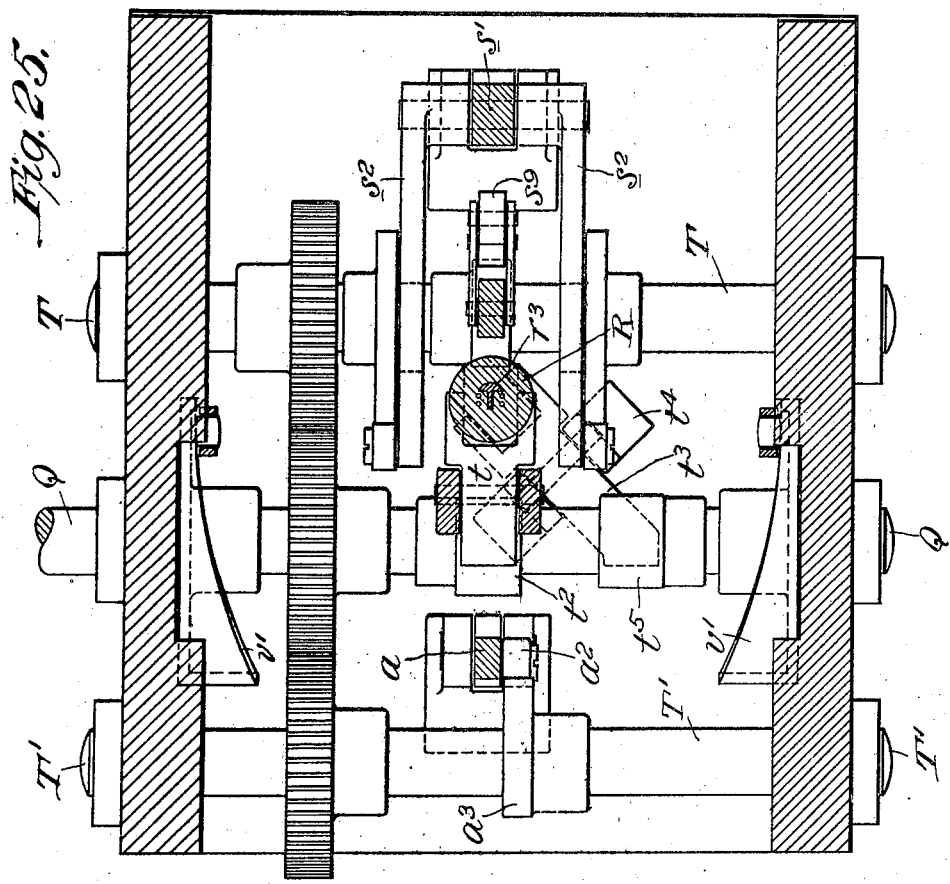

April 29, 1924.
W. C. HUGULEY ET AL
1,491,861
MACHINE FOR MAKING THE SOCKET MEMBERS OF SNAP BUTTONS
Filed Sept. 22, 1916   21 Sheets-Sheet 16
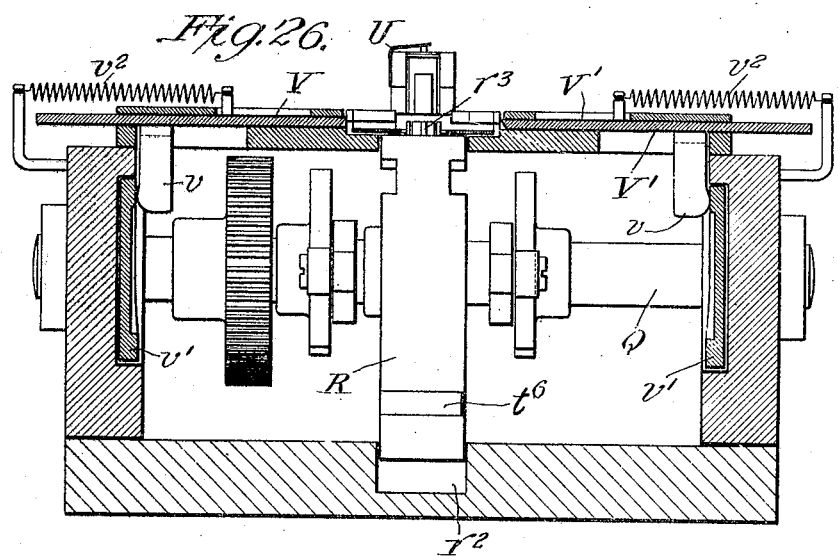
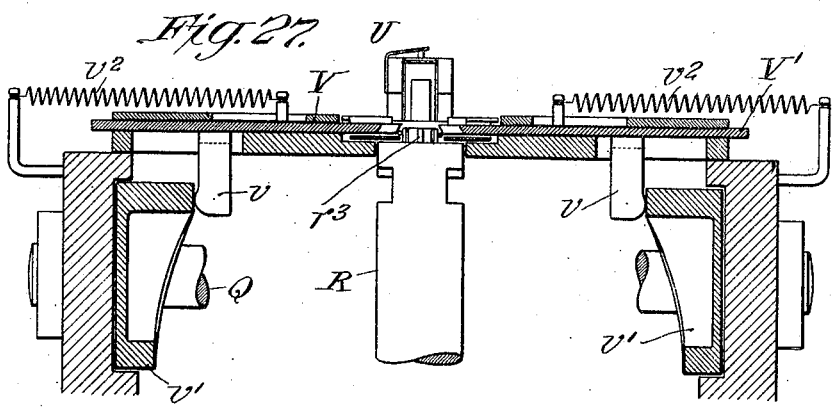
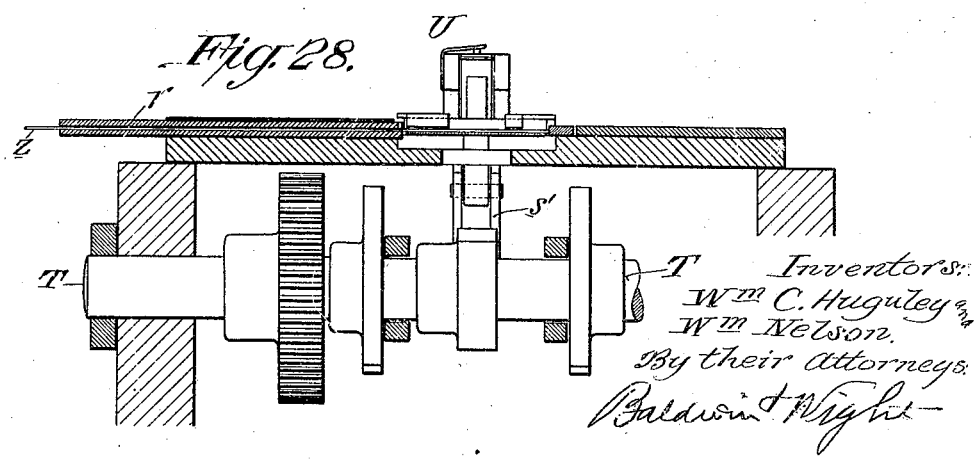
Inventors:
Wm C. Huguley &
Wm Nelson.
By their Attorneys
Baldwin & Wright

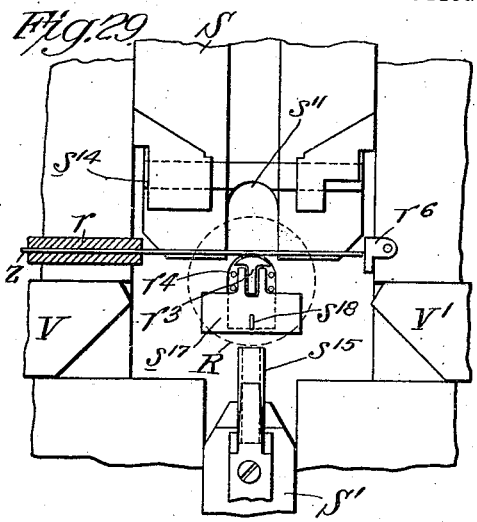
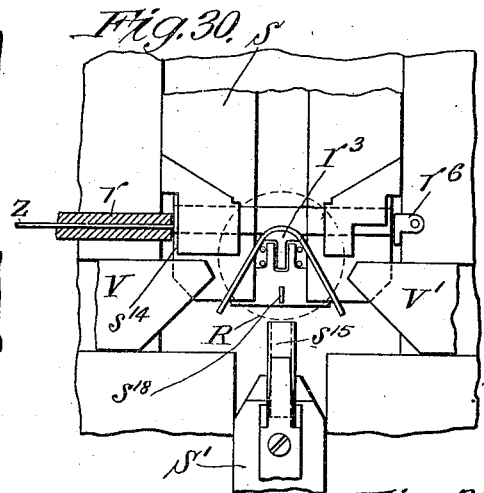
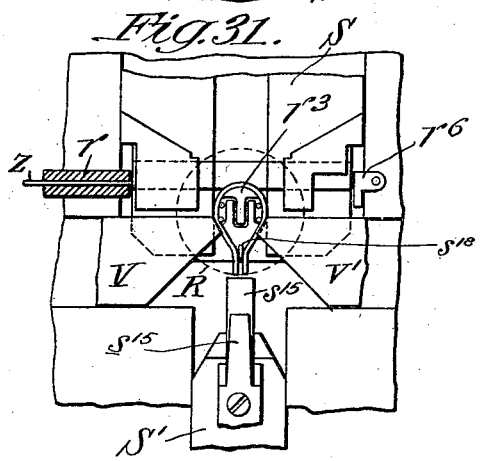
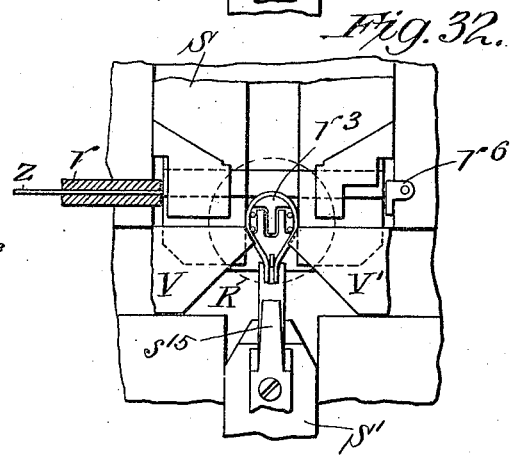
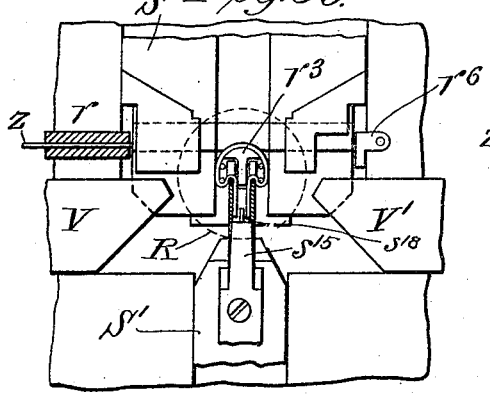
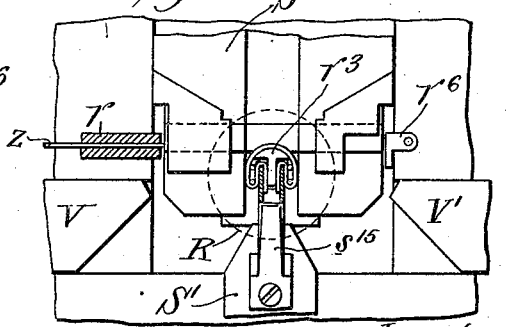

April 29, 1924.
W. C. HUGULEY ET AL
1,491,861
MACHINE FOR MAKING THE SOCKET MEMBERS OF SNAP BUTTONS
Filed Sept. 22, 1916 21 Sheets-Sheet 18
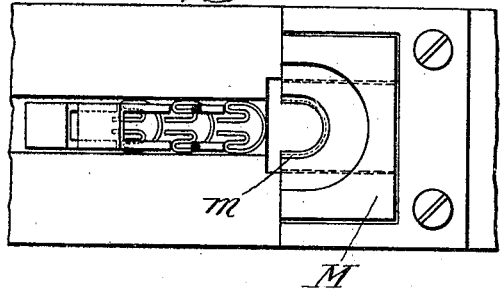
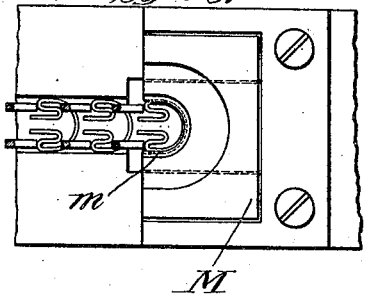
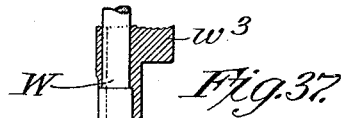
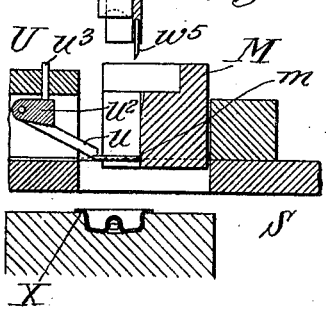
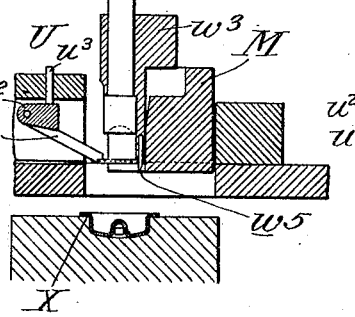
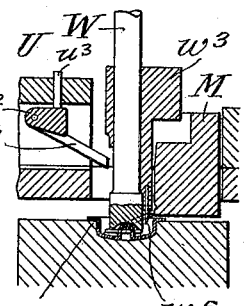
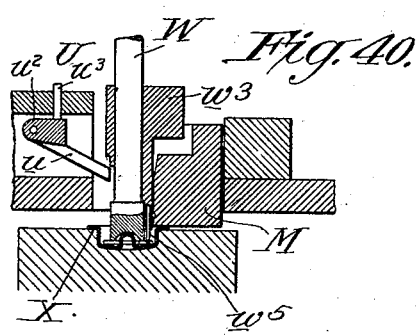
Inventors:
Wm C. Huguley and
Wm Nelson
By their Attorneys:
Baldwin & Wight

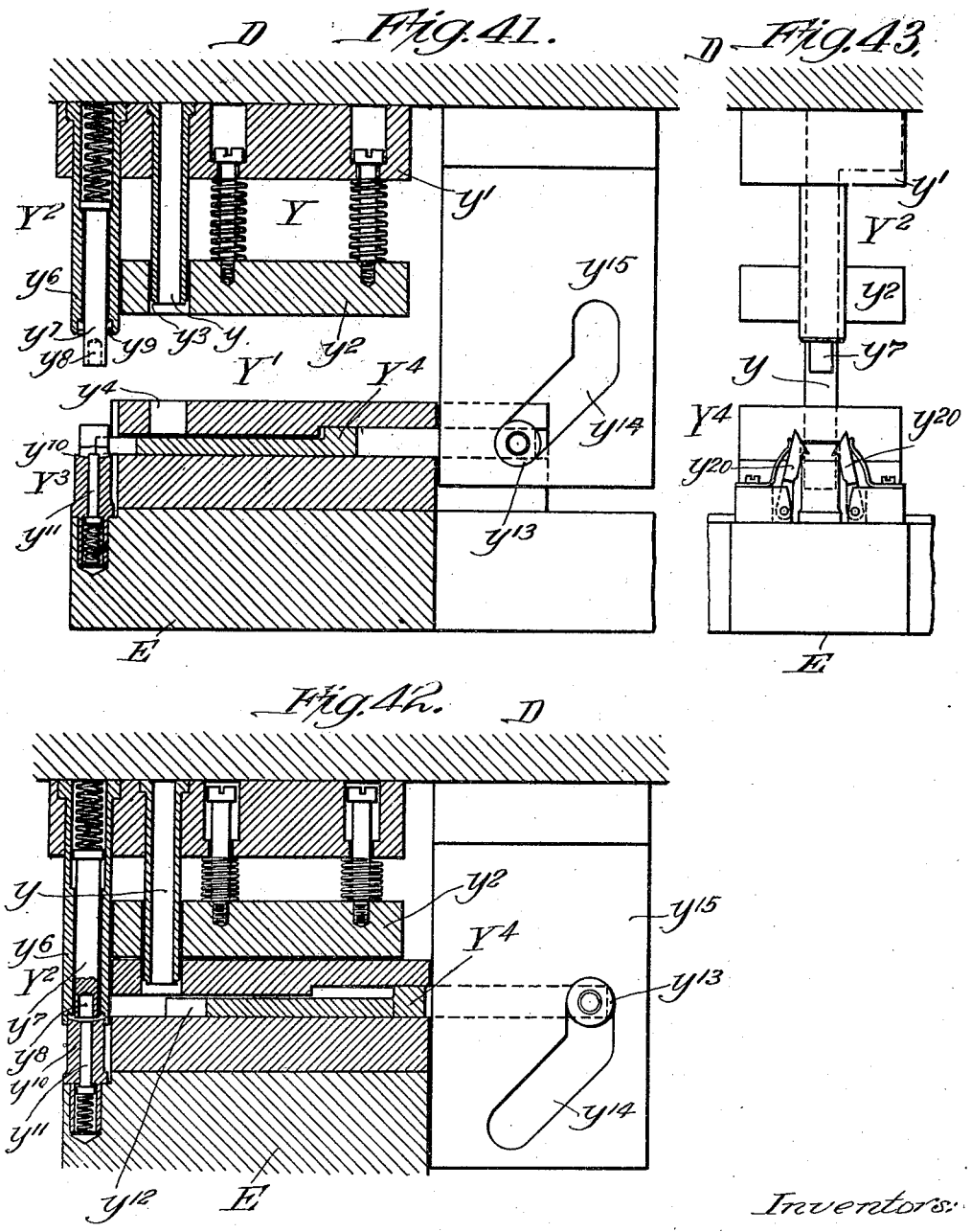

April 29, 1924.
W. C. HUGULEY ET AL
1,491,861
MACHINE FOR MAKING THE SOCKET MEMBERS OF SNAP BUTTONS
Filed Sept. 22, 1916   21 Sheets-Sheet 20
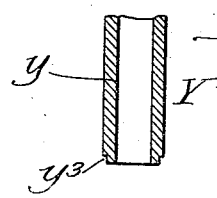
Fig. 44.
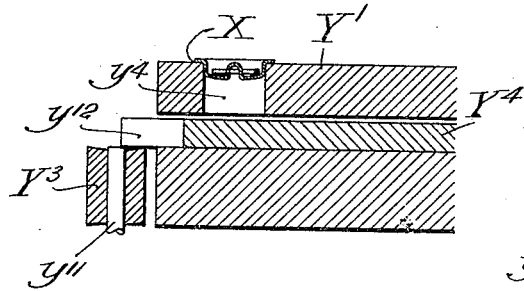
Fig. 45.
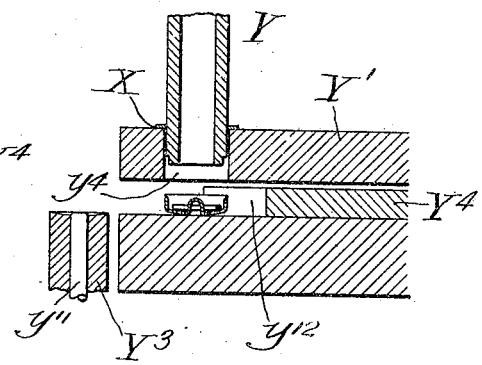
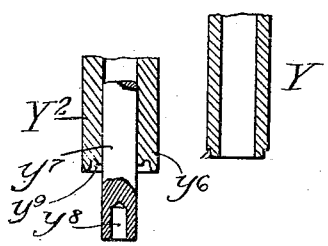
Fig. 46.
Fig. 47.
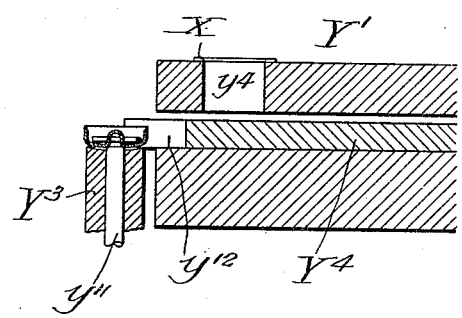
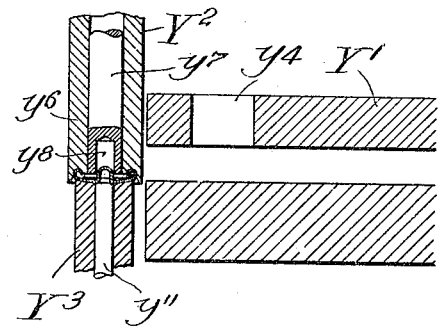
Inventors,
Wm. C. Huguley
Wm. Nelson.
By their Attorneys,
Baldwin & Wight April 29, 1924.
W. C. HUGULEY ET AL.
MACHINE FOR MAKING THE SOCKET MEMBERS OF SNAP BUTTONS
Filed Sept. 22, 1916    21 Sheets-Sheet 21
1,491,861
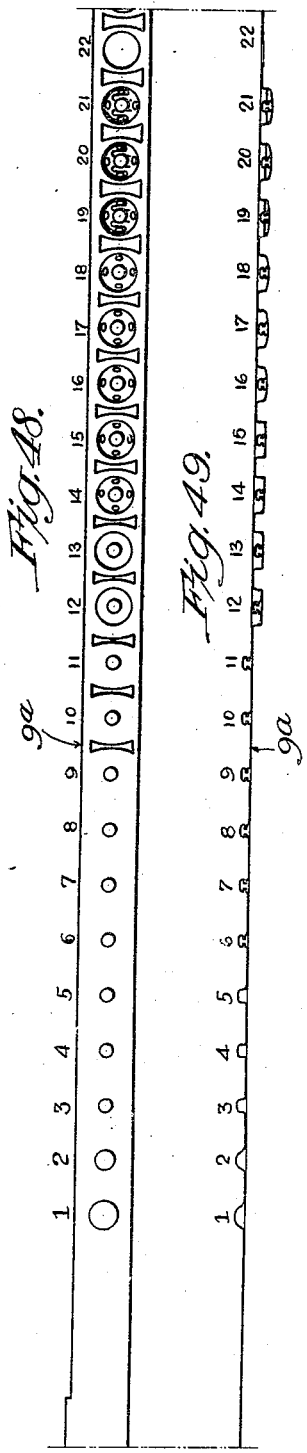
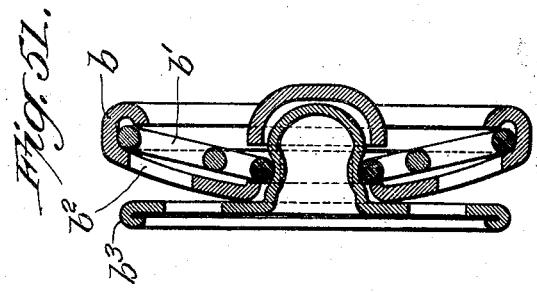
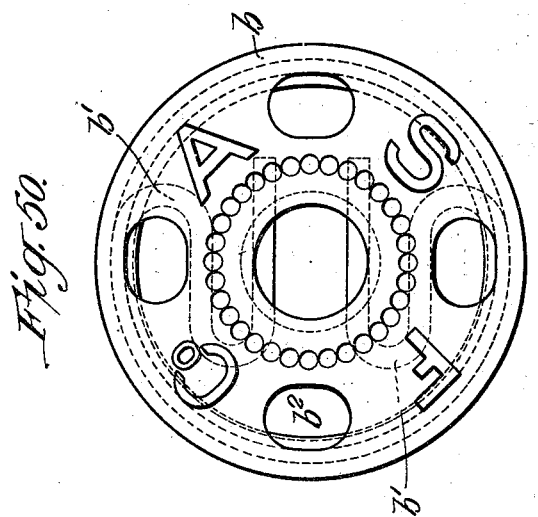
Inventors:
W<sup>m</sup> C. Huguley and
W<sup>m</sup> Nelson.
By their Attorneys:
Baldwin Wight Patented Apr. 29, 1924.

1,491,861

UNITED STATES PATENT OFFICE.

WILLIAM C. HUGULEY AND WILLIAM NELSON, OF NEW YORK, N. Y.; SAID NELSON ASSIGNOR OF HIS RIGHT, BY MESNE ASSIGNMENTS, TO CONSOLIDATED AMERICAN FASTENER COMPANIES, INC., OF NEW YORK, N. Y., A CORPORATION OF NEW YORK.

MACHINE FOR MAKING THE SOCKET MEMBERS OF SNAP BUTTONS.

Application filed September 22, 1916. Serial No. 121,647.

*To all whom it may concern:*

Be it known that we, WILLIAM C. HUGULEY and WILLIAM NELSON, both citizens of the United States, and both residing in New York, county and State of New York, have invented certain new and useful Improvements in Machines for Making the Socket Members of Snap Buttons, of which the following is a specification.

This invention relates to the manufacture of one of the parts of the well known snap fastener or press button, which comprises two members, viz, a stud and a socket.

The socket member consists of a concavo-convex body portion having a peripheral edge which is turned inwards, and a central hollow portion properly shaped to form a socket for the stud. A spring, mounted within the body portion, is held by the turned edge thereof, and it has two parallel arms extending through slots in the central part of the socket, which are held in such position as to engage the stud when the latter enters the socket. This general form of press button or snap fastener is now well known and very extensively used.

Our machine for making the socket member of the fastener is adapted to first progressively form a hollow projection on the stock, which is subsequently slotted to receive the arms of a spring catch, and after this that part of the stock between the projections is punched out, in order to facilitate the subsequent drawing operations. The stock is then bent to form a depression in the stock for the body portion of the socket, is next pierced to provide thread holes, and is then shaped and has the initials of the manufacturer applied. After this, the previously formed spring is inserted, and finally the socket member is cut or blanked out from the stock, and the peripheral edge is turned over the outer part or body of the spring.

The springs are formed from wire of indefinite length, which is fed through straightening rolls to wire bending devices which give shape to the spring, and other mechanism is employed for feeding the springs to a suitable spring holder, from which they are delivered one by one to the socket member of the fastener and made to engage therewith. These operations are so performed and so timed that a single socket with an inserted spring is completed by a single revolution of the actuating shaft, the different operations being simultaneously performed on different parts of the stock, which is fed forward step by step so that the socket may be gradually produced without defects and without undue strain on the stock or the metal forming the socket members of the fastener.

The remaining figures are, for the most part, on an enlarged scale.

Figure 4:
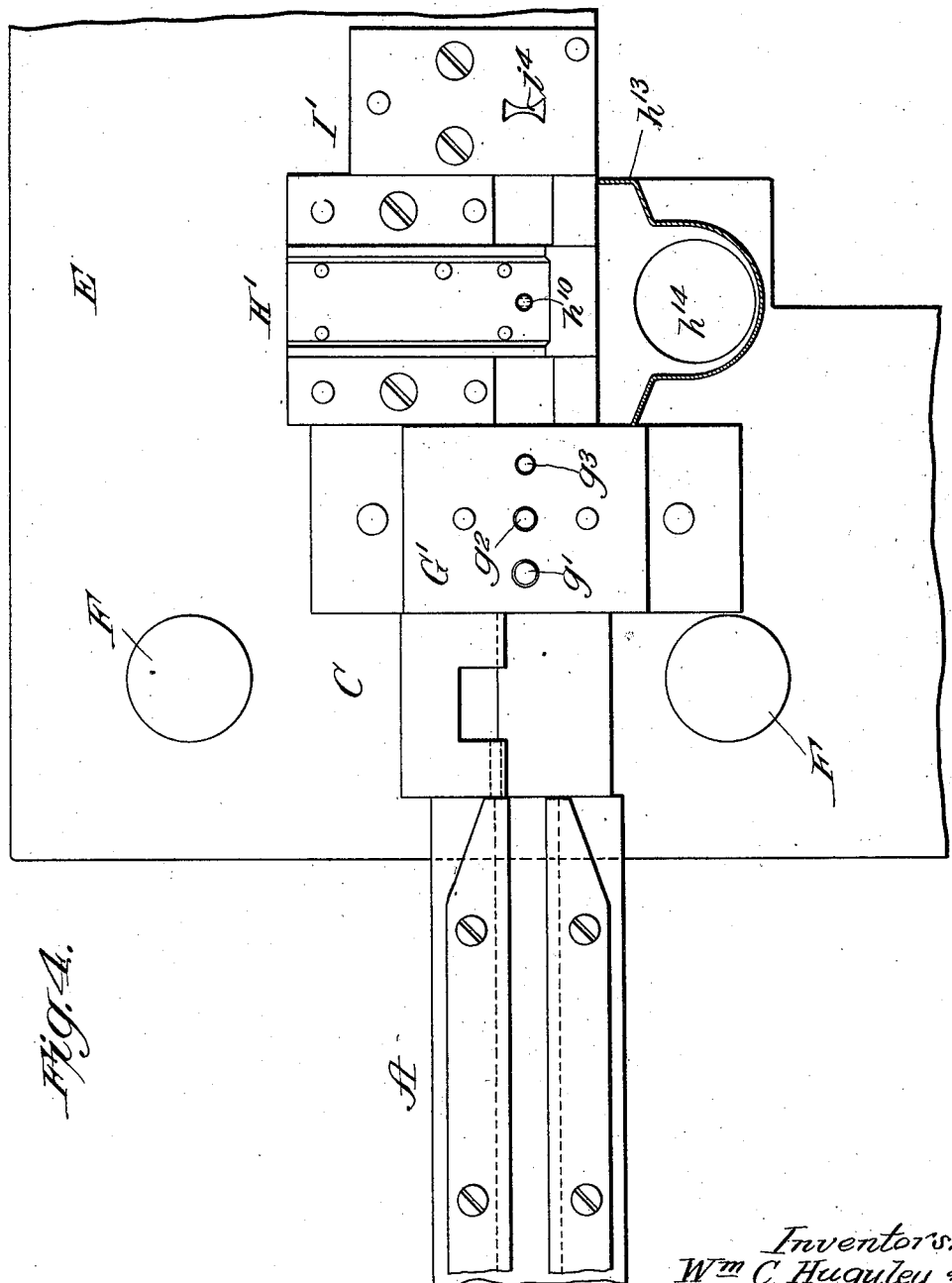

Figure 4 shows in plan the entrance guide for the stock, the device for notching the stock to regulate the feed, the dies for forming the hollow projections on the stock, mechanism for forming slots in these projections, and the die for cutting out the stock between the projections, after the slotting operation;

Figure 5 shows a bottom plan view of some of the upper dies and illustrates particularly parts of the notcher, the dies for forming hollow projections in the stock, mechanism for forming slots in such projections, and the die for cutting out the stock between the projections;

Figure 6 is a detail view in perspective of the device for notching the edge of the stock;

Figure 7 is a similar view of the same device, showing the parts in a different position;

Figure 8 shows a longitudinal section of the dies and mechanism illustrated in Figures 4 and 5;

Figure 9 is a bottom plan view of some of the upper dies, illustrating particularly the upper die for forming the body portion of the socket, the dies or punches for piercing holes in the socket, the upper die for giving a concavo-convex shape or form to the body of the socket and applying the initials of the manufacturer thereto, some of the devices employed for inserting the springs in the sockets, and part of the mechanism for bending over the edge of the socket and fastening the spring therein;

Figure 10 is a top plan view of the lower dies, etc., which co-operate with the dies illustrated in Figure 9;

This figure also shows in plan the stock feeding mechanism.

Figure 11 shows a longitudinal section of the parts illustrated in Figures 9 and 10;

Figure 12 shows in section the mechanism for cutting slots in the hollow projection formed in the stock;

In Figure 12, the upper die carrier is in its elevated position, and the slot cutters are withdrawn or in their rearward position.

Figure 13 shows the upper die carrier in its lowered position, with the cutters advanced and in the position they assume just after having formed slots in the hollow projection of the stock;

Figure 14 is a detail view in section, showing how the metal is held while the slots are being formed;

Figure 15 is a view similar to Figure 14, but taken at right angles thereto;

Figure 16 is a detail view in plan with the parts in the same position as in Figures 14 and 15;

Figure 17 is a front elevation of the spring forming mechanism and the stock feed mechanism;

Figure 18 is a detail view of part of the stock feed mechanism;

Figure 19 is a top plan view of the spring forming mechanism and the devices employed for feeding the springs to a spring holder;

Figure 20 is a detail view in perspective of one of the devices employed for bending the wire into shape;

Figure 21 is a perspective view of part of the mechanism employed for bending the wire around the arbor to give shape to the spring;

Figure 22 is a sectional view taken transversely to the longitudinal axis of the machine and showing part of the spring forming and spring feeding mechanism, and the devices employed for transferring springs from their holder to the socket members of the fasteners;

Figure 23 is a view similar to Figure 22 with some of the parts in a different position;

Figure 24 is another view of the mechanism shown in Figures 22 and 23 with the parts in still another position;

Figure 25 shows a horizontal section of the spring forming mechanism;

Figure 26 is a longitudinal section of the spring forming mechanism with some of the slides which give certain bends to the wire in their withdrawn position;

Figure 27 is a view similar to Figure 26, with the slides advanced;

Figure 28 is a sectional view of part of the spring forming mechanism, and illustrates how the wire is guided to position in front of the arbor on which the spring is formed;

Figures 29 to 34 inclusive are plan views showing different steps of the wire bending operation;

Figure 29 shows how the wire is fed to position in front of the arbor;

Figure 30 shows the first bending operation, where the wire is bent to V form;

Figure 31 shows the next operation, where the wire is bent around the arbor and is provided with two parallel arms;

Figure 32 shows the next step, where a slide is advanced and engages the arms;

Figure 33 illustrates the next step, where the slide bends the wire to increase the length of the arms and decrease the area of the loop;

Figure 34 illustrates the final bending operation;

Figure 35 is a detail plan view illustrating how the springs are fed to a spring holder;

Figure 36 is another view of the same devices;

Figure 37 is a detail view illustrating how a spring catch is delivered from the spring holder to a socket member before the latter is separated from the stock;

In Figure 37 the plunger is in its elevated position.

Figure 38 is a view similar to Figure 37, but it illustrates how the plunger engages the spring in the spring holder;

Figure 39 shows the next step, where the plunger has descended further and has caused the arms of the spring to engage in the slots of the socket;

Figure 40 shows the final step, where the spring is moved away from its holder and is completely inserted in the socket;

Figure 41 is a detail view in section, illustrating the devices for transferring a socket member with a spring catch therein to the finishing devices, and it also illustrates the operation of the finishing dies;

In Figure 41, the upper die is in its elevated position.

Figure 42 is a view similar to Figure 41, showing the upper die in lowered position;

Figure 43 shows an end elevation of part of the mechanism shown in Figures 41 and 42 and illustrates particularly spring pressed dogs for holding the button while it is being finished;

Figure 44 is a detail view illustrating particularly the manner in which the spring containing socket is cut from the stock;

In Figure 44 the cutting die is in elevated position.

Figure 45 is a view similar to Figure 44, but shows the cutting die in its lower position, with the socket member severed from the stock;

Figure 46 shows the same devices that are illustrated in Figures 44 and 45, but it shows how the socket member after having been severed from the stock is transferred to a finishing die;

Figure 47 illustrates how the final operation is performed, where the peripheral edge of the socket is bent inwards and over upon the body of the spring catch;

Figure 48 is a plan view of the stock, and shows how the successive operations are performed by the machine;

Figure 49 is a sectional view of the stock, and shows the different steps of the several operations;

Figures 50 and 51 are views on an enlarged scale of the fastener;

Figure 50 is a bottom plan view of the socket member.

Figure 51 shows a central section of the two members.

Figure 1:
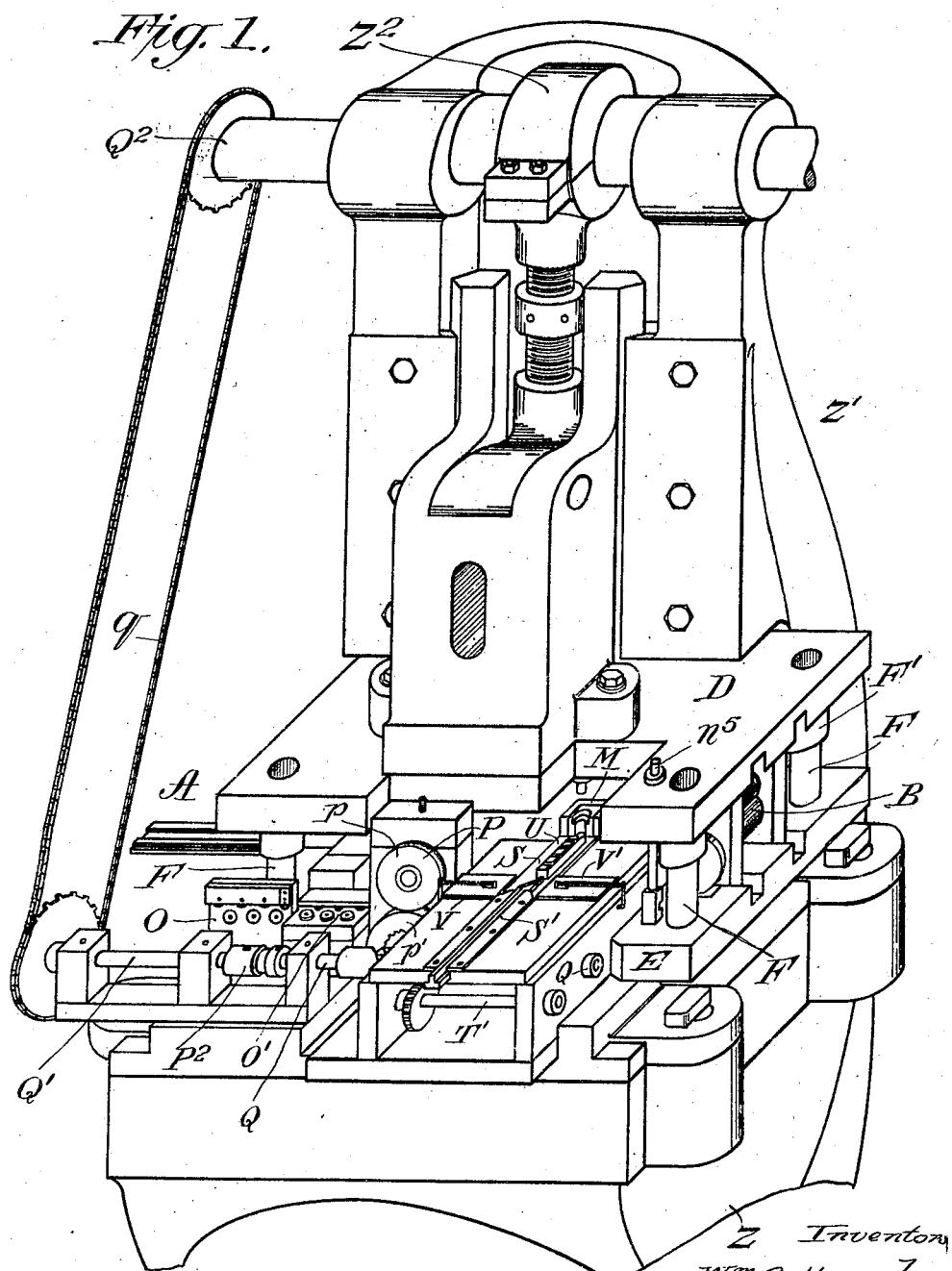
Figure 1 is a perspective view of a machine embodying our improvements.
Figure 2:
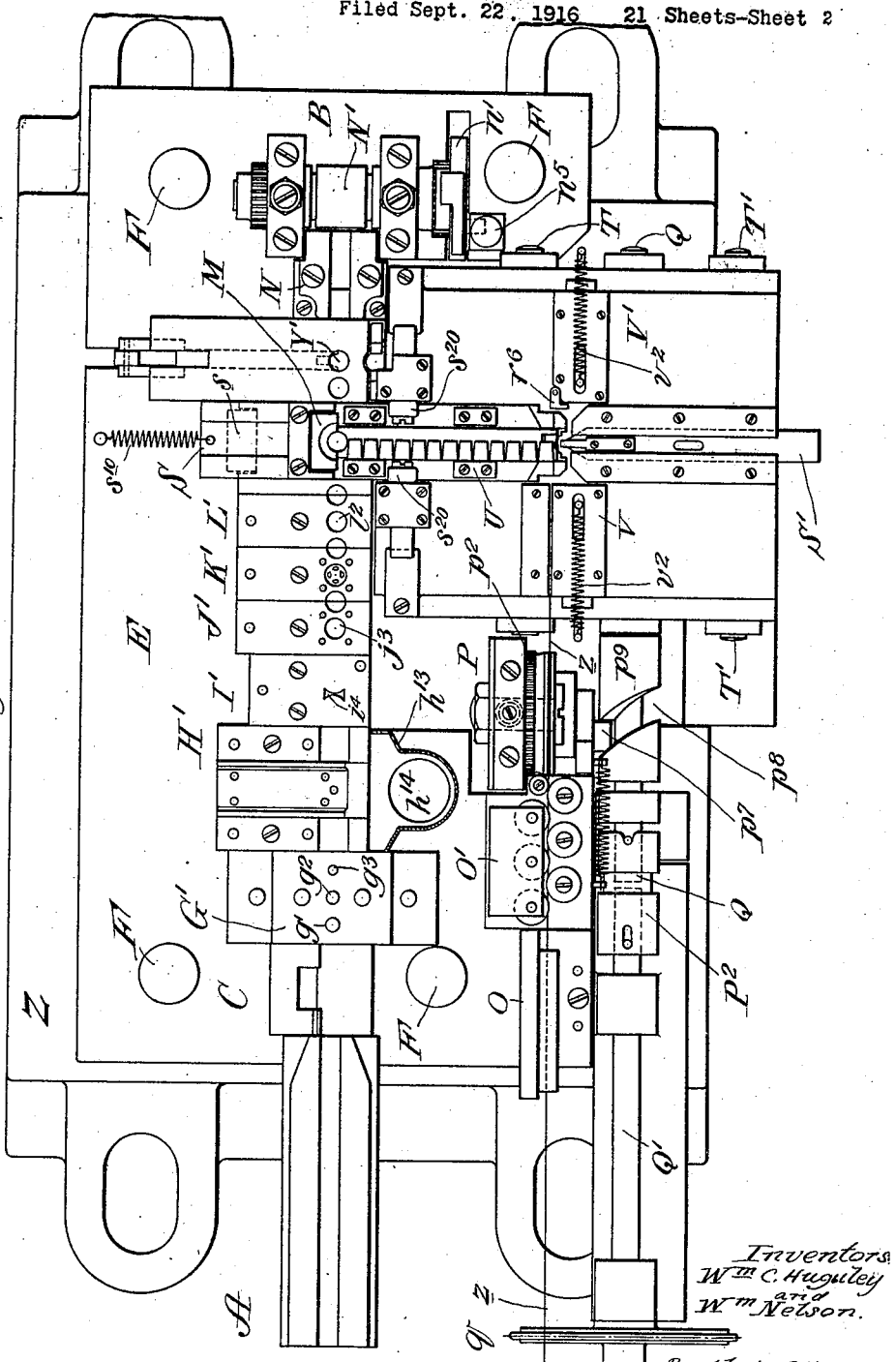
Figure 2 is a plan view of the lower part of the machine, showing the general arrangement of the lower dies, the stock feed mechanism, the wire feed devices, and the spring catch forming mechanism.
Figure 3:
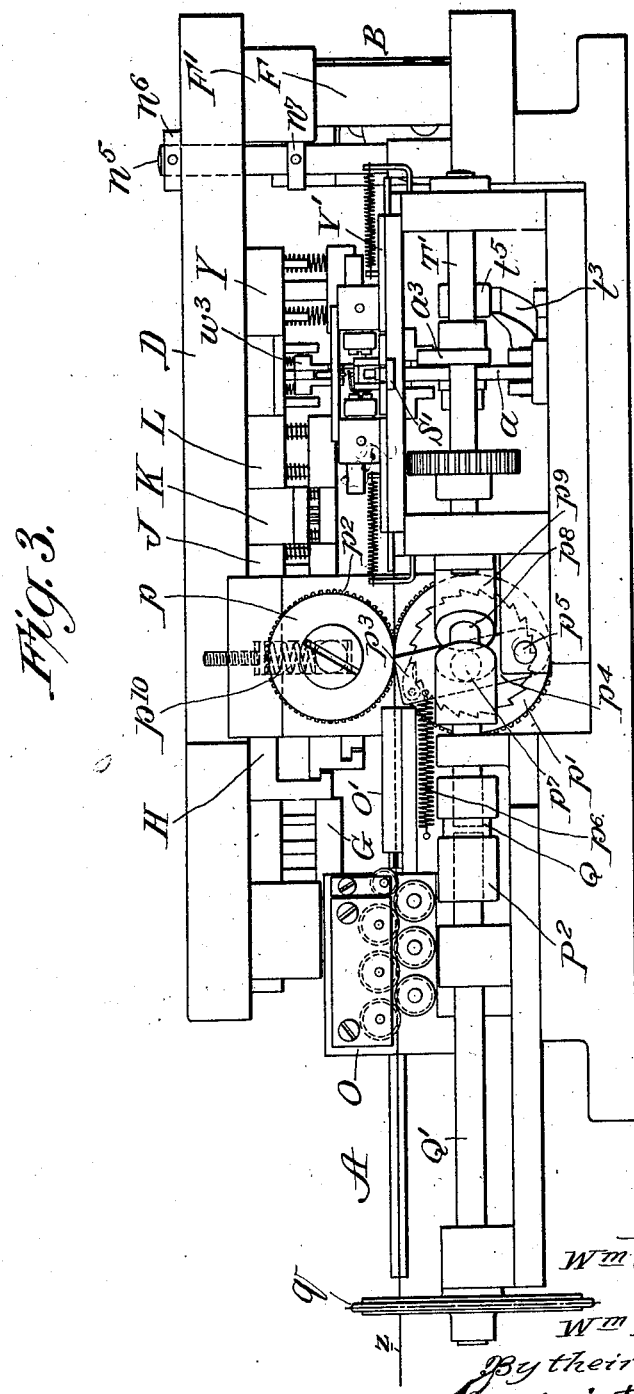
Figure 3 shows a front elevation of the upper and lower dies, the feed mechanism and the wire bending devices.

The main frame of the machine may be of any suitable kind. It comprises a lower part Z and an upper part $Z^1$. $Z^2$ indicates mechanism for raising and lowering the upper dies. This is the main actuating shaft for all of the mechanism. The end of the machine where the stock enters is the left hand end. Figure 1 is a perspective view looking mainly at the front of the machine. Two sets of mechanisms are employed, one for forming the buttons and the other for forming the springs. The button forming mechanism is at the rear of the machine and the spring forming mechanism at the front thereof.

The stock, in the form of a metal strip or ribbon, is passed through a guide A and between the upper and lower dies and punches to a stock feeder B which is operated in the manner hereinafter described to pull the stock through the machine between the dies. From the guide A, the stock passes to a device C which progressively notches or cuts out from the metal a small part of the edge portion of the strip to form a shoulder $c$ which engages a part $c^1$ of the device and limits the forward movement of the stock while being fed. This device insures accuracy of feed inasmuch as the part $c^1$ lies in front of the shoulder $c$ during the forward movement of the stock and thus prevents any false movement due to the momentum of the metal or the improper action of the stock feeder. The notcher C comprises upper members $C^1$ supported by the upper die carrier D and lower members $C^2$ supported by the bed plate E. As the upper die carrier descends, the member $C^1$ cuts from one edge of the stock a small strip of metal forming the shoulder $c$, thus decreasing the width of the strip by successive cuts and after each cut the strip may be moved forward until the shoulder $c$ engages the part $c^1$ and thus prevents further movement. The upper die carrier is supported by posts F, rising from the bed plate and which enter sockets $F^1$ on the die carrier.

The stock is next operated upon by upper and lower dies G, $G^1$, to draw the metal in such manner as to gradually form a projection on the stock which is subsequently shaped to form the socket part of the button. It will be observed by reference to Figure 4 that the lower die is provided with a series of projections $g^1$, $g^2$, $g^3$. These projections are all of the same height but gradually decrease in width. The upper die G is, in like manner, provided with a series of depressions $g^4$, $g^5$, $g^6$, which co-operate with the projections $g^1$, $g^2$, $g^3$, to first form a hollow, relatively wide projection in the stock, and then gradually reduce its diameter without decreasing its height. This is done by gradually drawing the metal from the stock and then returning part of the metal thereto. In this way undue strain or breakage of the metal is avoided.

By reference to Figure 8, it will be observed that the projections $g^1$, $g^2$, $g^3$, are formed on die bodies, which rest on the bed plate E and extend through a block $G^2$ into a stripper $G^3$. The recesses or depressions $g^4$, $g^5$, $g^6$, are formed in die bodies which extend through a block $G^4$ attached to the upper die carrier and into a stripper $G^5$. As the upper die carrier descends, the projections $g^1$, etc., force the metal into the depressions $g^4$, etc., and the posts for the studs are thus formed. After the projection is made on the stock, the next step in the process is to cut slots in the projection for receiving the parallel arms of the spring catch. This is done by the mechanism indicated at H, $H^1$.

The upper member H comprises a housing $h$ attached to the die carrier D in which is mounted a yielding spring pressed block $h^1$ having an undercut recess $h^2$ in which is mounted a slide $h^3$ having a bifurcated end provided with cutting edges $h^4$. The slide $h^3$ carries a roller $h^5$ engaging a slot $h^6$ in a cam plate $h^7$ attached to the upper die carrier. As the die carrier moves up and down, the stripper $h^1$ yields and the slide is reciprocated. The block $h^1$ carries a tubular casing or die $h^8$ for a spring pressed plunger $h^9$, Fig. 14, which is adapted to press lightly on the top of the projection of the stock and acts as a stripper to separate the projection from the die when the latter rises. The casing or die $h^8$ is provided at its lower end with a rib $h^{15}$ which bears upon the stock (Fig. 14) and tends to support it during the cutting operation. The two cutting edges $h^4$ of the bifurcated slide $h^3$ straddle this rib $h^{15}$ while cutting, as clearly shown in Fig. 16.

The lower member $H^1$ comprises an anvil or teat $h^{10}$ on a post or plunger $h^{11}$ supported on the bed E and a spring pressed stripper $h^{12}$. It will be observed that the anvil is of approximately the same size and shape as the hollow projection and it is formed with recesses on opposite sides to receive the cutter.

As the die carrier descends, the stripper $h^{12}$ is depressed and the anvil enters the hollow projection of the stock. The cutter then advances and cuts slots on opposite sides of the projection, in the manner indicated in Figures 13 to 16 inclusive. When the die carrier rises, the stripper also rises and the cutters are withdrawn. The small strips of metal cut from the projection enter a hood $h^{13}$ and drop into a hole $h^{14}$.

The next operation is to cut out the metal between the projections of the stock in order to relieve it of strain and to facilitate the drawing operations. This is done by the dies I, $I^1$. The upper member I comprises a die $i$, the body $i^1$ of which is held in a casing $i^2$ attached to the upper die carrier. The die extends into a spring pressed stripper $i^3$ of any suitable construction.

The lower member $I^1$ consists of a die $i^4$ suitably recessed to receive the punching die $i$. The metal thus punched out falls through a hole $i^5$.

The stud receiving socket part of the button is now complete. After this the stock is depressed to form the body portion of the button. This is accomplished by the next set of dies J, $J^1$. The upper member J comprises a die rod $j$ mounted in a holder $j^1$ attached to the upper die carrier and extending through a spring pressed stripper $j^2$. The lower end of the rod is suitably shaped to receive the projection of the stock and to depress the metal around the projection.

The parts marked $x$ are merely depressions in the dies to prevent the projections on the stock from being crushed when the stock is fed without advancing the projections from one set of dies to another.

The lower member $J^1$ is formed with a recess $j^3$ to receive the depressed metal. The spring pressed strippers are indicated at $j^4$.

In order to form thread holes in the body of the button, metal piercing dies are employed. These consist of two members K and $K^1$. The upper member K comprises four punch rods $k$ supported by the upper die carrier and extending into a spring pressed stripper $k^1$. The other member $K^1$ consists of a die block having holes $k^2$ to receive the piercing rods and arranged over a hole $k^3$ through which the small pieces of metal pierced from the stock fall.

It will be observed by reference to Figure 49 that the bottom of the depression formed by the dies J, $J^1$ is flat and remains so until after the piercing operation. After this, the metal is operated upon by dies L, $L^1$ which give a concavo-convex shape to the depressed portion. The upper die L consists of a die rod $l$ supported on the upper die carrier and extending through a spring pressed stripper $l^1$. The lower die $L^1$ is formed with a suitably shaped recess $l^2$ to give the concavo-convex shape to the button. The manner in which the dies L, $L^1$ operate will be clear from an inspection of Figure 11 of the drawings. The dies may be, and preferably are so formed that they will emboss the convex side of the depression and will also apply the initials of the manufacturer thereto.

The button is now ready to receive the spring catch, the process of the construction of which will be hereinafter described. For the present, it may be stated that as fast as the springs are formed, they are delivered to a spring holder M and are transferred therefrom to the buttons.

After the springs are inserted, the button is cut from the stock and is delivered from the machine while the stock passes through a guide N to feed rolls $N^1$, $N^2$, which are intermittently operated to feed the stock step by step. The upper feed roll is spring pressed, as indicated at $n$, and it is geared to the lower one. The shaft of the lower feed roller carries a disk $n^1$ and a ratchet wheel $n^2$. The disk is loose on the shaft and is provided with a pin $n^3$ which enters a slot $n^4$ in a vertical bar $n^5$ which extends loosely through the upper die carrier and is provided with collars $n^6$, $n^7$ above and below said carrier, this arrangement providing for a limited amount of lost motion between the bar and the upper die carrier, the bar being moved vertically when the carrier engages one or the other of the collars. The disk carries a pawl $n^8$ engaging the ratchet. By this mechanism, a step by step movement is given to the feed rollers, which are suitably roughened to grip the stock and the overthrow of the stock is prevented by the notcher hereinbefore described.

Before describing how the spring catches are inserted in the button, the manner in which these catches are produced will be explained.

The wire $z$ for the springs is fed to rollers O, $O^1$, which remove all kinks or bends in the wire. The first set of rollers O is arranged vertically, i. e., they turn about horizontal axes, while the second set $O^1$ is arranged horizontally. These rollers may be supported in any suitable housings.

From the straightening rollers, the wire passes to the wire feeding devices P, comprising rollers $p$, $p^1$ geared together as shown at $p^2$, and operated by a pawl $p^3$ carried by an arm $p^4$ pivotally mounted at $p^5$ and drawn in one direction by a spring $p^6$. The arm $p^4$ carries a roller $p^7$ which enters a cam groove $p^8$ in a hub $p^9$ on the shaft Q. As the shaft Q revolves, the arm $p^4$ is oscillated and the rollers are turned step by step to feed the wire through the straightening rollers and to the wire bending devices. The upper roller $p$ is provided with yielding bearings $p^{10}$. $P^2$ indicates a clutch connecting the shaft Q with the shaft $Q^1$, which latter shaft is connected by gearing $q$ with the crank shaft $Q^2$. In this way, the wire is fed step by step through the mechanism which cuts it into suitable lengths and bends the cut off portions into springs.

The wire passes from the feed mechanism through a pipe guide $r$, (Fig. 19) over an arbor R around which the wire is bent. This arbor comprises a body portion, the lower end $r^1$ of which extends into a socket $r^2$ and the upper portion of which extends through a suitable guide in the machine frame, and carries a former $r^3$, which is of general T-shape with a curved top and on each side of the stem of the former are arranged upwardly projecting pins $r^4$ which are held in place by set screws $r^5$ (Fig. 21). $r^6$ indicates a stop which limits the advance movement of the wire and locates it in proper position to be bent.

The wire is bent around the former by devices carried by two slides S, $S^1$. The rear slide S rests on a roller $s$ and moves beneath rollers $s^{20}$. It is reciprocated by a lever $s^1$ pivotally connected with arms $s^2$, which are enlarged near their central portion and have openings at $s^3$, through which the shaft T extends. Said arms $s^2$ carry a roller $s^4$ actuated by a cam $s^5$ on the shaft T. The slide is raised and lowered by levers $s^6$ carrying a roller $s^7$ actuated by a cam $s^8$ on the shaft T, and also carrying a roller $s^9$ which engages the under side of the rear slide. This slide is moved inward or forward by the lever $s^1$ and is drawn outward by the spring $s^{10}$.

The front slide $S^1$ is reciprocated by a lever $a$, which engages the slide at $a^1$ and carries a roller $a^2$ engaged by a cam $a^3$ on the shaft $T^1$. The cam moves the slide inward, while a spring $a^4$ moves it in the opposite direction.

The shafts T, $T^1$ are geared to the shaft Q hereinbefore referred to, and which is clutched to the shaft $Q^1$ driven by the crank shaft of the machine.

The arbor R is lowered at proper times by a lever $t$ pivoted to the frame at $t^1$ and engaged by a cam $t^2$ on the shaft Q. The arbor is raised by a lever $t^3$, pivoted in supports $t^4$ and operated by a cam $t^5$ on the shaft Q. The lower end of the lever $t^3$ enters a recess $t^6$ in the lower end of the arbor.

The rear slide S at its inner or front end is formed with a U-shaped opening $s^{11}$ (Fig. 21) and it carries cutting and bending devices on its upper side. $s^{12}$ indicates a curved recess into which the wire extends while being bent. The slide engages the wire on opposite sides (Fig. 30) and causes it to be bent into V-shape. A cutting edge is provided at $s^{14}$, which severs a suitable length of wire from the supply to form a single spring.

The front slide $S^1$ carries a former $s^{15}$, which is recessed as indicated at $s^{16}$ (Fig. 20), and which operates in the manner hereinafter described. $s^{17}$ indicates a plate carrying a projection $s^{18}$. The plate $s^{17}$ is secured to the frame of the machine and acts as a fixed stripper for the spring after it is formed. The projection $s^{18}$ co-operates with the bending devices during such operation. The manner in which these parts operate will be presently described.

Above the rear slide S are mounted feeding devices U comprising a series of fingers $u$ carried by finger supports $u^1$, which are pivotally mounted in the supporting frame $u^2$, and each one is pressed downwards by a pin $u^3$ on which bears a spring $u^4$. The feeding devices have no movement back and forth with the rear slide, but the fingers are adapted to move up and down therewith.

Co-operating with the slides S and $S^1$ are slides V, $V^1$, which are mounted to move in a direction transverse to that in which the slides S and $S^1$ operate. These slides V, $V^1$ are mounted in suitable guides and each has a projection $v$ engaged by a cam $v^1$ on the shaft Q. The slides are withdrawn from operative position by springs $v^2$.

In making the spring the rear slide S first moves forward and cuts off from the supply a length of wire for making a single spring and bends it into V form, in the manner indicated in Figure 30, and during this operation the slides V, $V^1$ commence to advance. As soon as the wire is bent around the former $r^3$, in the manner indicated in Figure 30, the slides V, $V^1$ approach each other, engage the wire and bend it around the former $r^3$, and the pins $r^4$ in the manner indicated in Figure 31. The outer ends of the wire engage the stop $s^{18}$, which prevents such ends from overlapping or approaching too closely to each other. At this time, the front slide $S^1$ is moved forward and the former $s^{15}$ engages the ends of the wire, in the manner indicated in Figure 32. As the front slide moves further inward or rearward, the former bends the wire to the shape indicated in Figure 33. During this operation, the slides V and $V^1$ commence to withdraw, while the rear slide remains stationary. The front slide moves further forward and gives a final bend to the wire, as indicated at Figure 34.

Figure 22 shows the condition of the mechanism, while a spring is being bent around the arbor which is then in an elevated position, and this figure of the drawing shows the rear slide S, at the extremity of its inward movement towards the arbor. At this time, it will be observed that the inner end of the rear slide is in its elevated position.

Figure 23 shows the arbor lowered, the front slide advanced, and the rear slide lowered, but still in its inward position. This takes place after a spring has been formed and the stripper $s^{17}$ has detached a spring from the former $r^3$. The spring detached by the stripper is received by the inner end of the rear slide and is carried rearwards thereby when the rear slide retreats.

Figure 24 shows the position of the mechanism when the front slide has been withdrawn from the arbor and the rear slide has been moved rearwards. During this rearward movement of the rear slide the spring fingers $u$ rise and permit the completed springs to pass rearwards with the slide beneath them. When the rear slide again moves forward, the fingers prevent the spring from also moving forward and thus the spring is given a position nearer to the rear end of the rear slide. During the repeated reciprocations of the rear slide, the spring is step by step moved rearwards towards the holder M, and as the springs are successively made, they are in like manner moved rearwards toward the spring holder, in the manner indicated in Figures 35 and 36. As each spring enters the spring holder, it is received by the groove $m$ therein. Said spring holder is carried by the rear slide S and moved back and forth therewith.

As soon as a spring enters the holder M (Fig. 37), it is engaged by a punch W, which extends through a block $w$ supported by the upper die carrier D. The upper end of this punch extends into a recess in the die carrier (Fig. 11) and the punch is pressed downwardly by a spring $w^1$. Spring pressed rods $w^2$ also extend through the block $w$ and are adapted to engage the spring holder M, which, it will be observed, is supported by springs $m^1$ (Fig. 11). The spring holder is, therefore, adapted to be lowered when engaged by the rods $w^2$. The punch W extends through a block $w^3$, which is pressed downwardly by springs $w^4$ supported by the block $w$. The block $w^3$ carries a blade $w^5$, which is adapted to engage the spring at the proper time. Figure 37 shows the punch and blade in elevated position with the spring catch seated in the groove $m$ of the spring holder. When the upper die carrier descends, the punch W engages the spring, in the manner indicated in Figure 38. As the die carrier further descends, the rods $w^2$ engage the spring holder and depress it, as indicated in Figure 39. At the same time, the plunger W by a further downward movement, inserts the ends of the spring in the slots formed in the button, in the manner indicated in Figure 39. The continued downward movement of the die carrier imparts no further movement to the plunger W, but a further movement is given to the block $w^3$ carrying the blade $w^5$, which so operates upon the spring catch as to move it to the position shown in Figure 40 and the operation of inserting the spring is thus completed.

The stock is then advanced another step to the blanking out dies. The upper die Y (Fig. 41) consists of a hollow plunger $y$, secured to a block $y^1$ and extending through a stripper $y^2$. The lower end of the plunger is formed with a peripheral recess $y^3$. The die $Y^1$ consists of a plate having a hole $y^4$ to receive the plunger $y$. Figure 44 shows the plunger elevated and the stock resting on the lower die $Y^1$. Figure 45 shows the plunger lowered and the button separated from the stock.

The next operation is to turn over the periphery of the button to give it a strong and smooth edge and to hold the spring in place. This is done by the upper die $Y^2$ and the lower die $Y^3$. The upper die comprises a hollow rod $y^6$ supported by the block $y^1$ and within which is mounted a spring pressed plunger $y^7$ having a recessed lower end $y^8$. The lower end of the rod $y^6$ is recessed as indicated at $y^9$. The lower die $Y^3$ comprises an anvil $y^{10}$ within which is a spring pressed stripper rod $y^{11}$. $Y^4$ indicates a slide for transferring the button with the contained spring to the finishing dies. It is bifurcated at $y^{12}$ and it carries a roller $y^{13}$ extending into a slot $y^{14}$, in a cam plate $y^{15}$ carried by the upper die carrier.

Immediately after the button is blanked out the slide $Y^4$ moves it to the finishing dies in the manner indicated in Figure 41. As soon as this is done, the upper die $Y^2$ descends and the edge of the button is turned inward and engages the spring, as indicated in Figure 47. The button with the contained spring is now completed and may be delivered in any suitable way or pushed off from the die $Y^3$ by the next button delivered by the slide.

In order to hold the button in place when it is placed on the lower die $Y^3$ by the slide $Y^4$, spring dogs $y^{20}$ are employed. These also hold the button when the slide recedes. They also yield to allow the button to be ejected when the slide advances with another one.

Figures 48 and 49 indicate the successive operations performed on the stock. The steps of forming the hollow projections in the stock are indicated at 1, 2 and 3. No operations occur at 4 and 5 while the stock is being fed at these points. At 6 the hollow projection is slotted. No operations occur at 7, 8, 9, 10 and 11, but between the points 9 and 10, the metal is punched out as indicated at $9^a$. At 12 the metal is drawn or pressed downwards to form the body of the button. No operation occurs at 13. At 14 the thread holes are formed. No operations occurs at 15. At 16 a concavo-convex form is given to the button. At 17 and 18 no operations occur. At 19 the spring is inserted. No operation occurs at 20 or 21. At 22 the button is blanked out and it is then transferred to the finishing dies.

Figure 50 is a bottom plan view of the socket member $b$ of the button. The spring catch is indicated at $b^1$ and the thread holes at $b^2$. The stud member is indicated at $b^3$ in Figure 51 and this figure shows how the two members engage. As this form of snap fastener is well known, it needs no further description.

It will thus be seen that the machine is organized and operated to simultaneously and automatically form the socket members and the spring catches and to insert the catches in the socket members and the mechanism is so timed that as fast as a socket member is made, a suitably formed spring is inserted into it, and a complete button containing a spring catch is delivered from the machine during each operation thereof. While at times no shaping operation is performed on the stock when it is advancing step by step, at such times other operations are being performed and there is in fact no loss of time, a complete button being delivered, as before stated, at each operation of the machine.

We claim as our invention:

1. A machine for making the socket members of snap fasteners, comprising the combination of means for guiding and intermittently feeding the stock, and a series of sets of upper and lower dies and cutters between which the stock is fed step by step including dies for drawing the metal from the stock to form a projection thereon, dies for gradually reducing the metal thus drawn to proper size for the socket of the member, cutters for then cutting slots in said projection, dies for then forming the body portion of the member without disturbing the projection, dies for then piercing thread holes in the metal, dies for then inserting a wire spring in the socket member, and dies for then blanking out said member.

2. A machine for making the socket members of snap fasteners, comprising the combination of means for guiding and intermittently feeding the stock, a series of sets of upper and lower dies and cutters between which the stock is fed step by step, including dies for drawing the metal from the stock to form a projection thereon, dies for gradually reducing the metal thus drawn to proper size for the socket of the member, cutters for then cutting slots in said projection, dies for then cutting out the stock between the adjacent projections, dies for then forming the body portion of the member without disturbing the projection, and dies for then piercing thread holes in the stock, means for then inserting a wire spring in the member, and means for then blanking out the member.

3. A machine for making the socket members of snap fasteners, comprising the combination of means for guiding and intermittently feeding the stock, a series of sets of upper and lower dies and cutters between which the stock is fed step by step, including dies for drawing the metal from the stock to form a projection thereon, dies for gradually reducing the metal thus drawn to proper size for the stock of the member, cutters for then cutting slots in said projection, dies for then forming the body portion of the member without disturbing the projection, dies for then piercing thread holes in the stock, and dies for then giving a concavo-convex form to the body portion of the member, means for then inserting a wire spring in said member, and means for then blanking out the member.

4. A machine for making the socket members of snap fasteners, comprising means for guiding and intermittently feeding the stock, a series of sets of upper and lower dies and cutters for forming said socket members, means for forming a wire spring, means for delivering a formed spring to each socket member as it is formed, means for blanking out the socket member after it has received a spring, finishing dies for curling over the edge of the body portion of said socket member upon the spring, and means for transferring said member from the blanking out dies to the curling dies.

5. In a machine for making the socket members of snap fasteners, the combination with the upper and lower dies for forming a projection in the stock, of means for forming slots in said projection comprising spaced cutter blades, a slide to which they are attached, a slotted cam moving coincidently with the upper dies and means connecting the cam with the slide for reciprocating said slide.

6. In connection with the subject matter of claim 5, devices substantially as described for cutting out the stock between adjacent projections of the stock after the slotting operation.

7. The combination with means for forming the socket member, of a spring holder, means for feeding wire, means for cutting off and bending the wire into spring form, means for delivering springs thus formed one by one to the spring holder, means for transferring springs one by one to the socket members as soon as they are formed, means for then blanking out the socket members, and means for thereafter turning the edges of said members to hold the springs in place.

8. In a machine for making the socket members of snap fasteners, the combination of upper and lower dies for giving shape to the socket members without separating it from the stock, means for forming springs from a length of wire, a spring holder to which the springs are delivered, means for transferring the springs to the socket members before they are separated from the stock, means for thereafter blanking out or separating the members from the stock, and means for then fastening the springs in said members.

9. In a machine for making snap fasteners, the combination with upper and lower dies for forming the sockets without separating them from the stock, means for forming spring catches from a length of wire, a spring holder to which the springs are delivered one at a time, a yielding support for said spring holder, a plunger operating to partially transfer the springs from the holder to the socket members, and another plunger provided with a blade for completing the transfer of the springs to the sockets.

10. The combination with means for forming socket members, of means for producing spring catches, and means for feeding said spring catches one at a time to a holder, comprising a reciprocating slide and yielding fingers above the slide and below which the slide reciprocates while holding the catches during the movement of the slide in one direction.

11. The combination with means for forming the socket members, of means for bending wire into spring form, comprising an arbor provided with a former, a slide for giving a partial bend to the middle portion of the wire around the former, two slides for bending the side portions of the wire, and a fourth slide engaging the ends of the wire for giving the final bend thereto.

12. The combination with means for forming a socket member, of means for bending wire into spring shape, comprising a slide for cutting a length of wire from the supply and for partially bending the middle part of said cut off portion, reciprocating slides acting upon the side portions of the wire for further bending it, another slide moving transversely to those last mentioned and engaging the end portions of the wire for giving the final bend thereto, and means for transferring the springs to the socket members.

13. The combination with means for feeding wire step by step, of an arbor across which the wire is fed, a slide having a reciprocating and an up and down movement for partially bending the wire around the arbor, slides reciprocating transversely to the slide first mentioned for further bending the wire around the arbor, another reciprocating slide for giving the final bend to the wire, and feeders for the springs thus produced comprising pivoted spring pressed fingers cooperating with the slide first mentioned, and a holder to which the springs are delivered.

14. The combination with means for intermittently feeding a wire, of an arbor across which the wire is fed, a stripper cooperating with the arbor, means for raising and lowering said arbor, a slide provided with means for cutting the wire and partially bending it, means for reciprocating the slide and for raising and lowering its inner end, slides moving transversely to that first mentioned for further bending the wire around the arbor, an additional slide moving in the same direction as that first mentioned and provided with means for giving final shape to the spring, and means for reciprocating said slide towards and from the arbor.

15. The combination with means for forming socket members in a strip of metal, means for bending wire into spring form, a holder for the springs, means for feeding the springs one by one to said holder, a reciprocating plunger for causing the arms of the spring to engage a socket member without entirely removing said spring from its holder, and a plunger which subsequently operates to disengage the spring from the holder and complete its transfer to the socket member.

16. The combination with means for forming socket members in a strip of metal, means for bending wire into spring form, a holder for the springs, means for feeding the springs one by one to said holder, a reciprocating plunger engaging the arms of the spring to engage them with a socket member without entirely removing said spring from its holder, a plunger which subsequently operates to disengage the spring from the holder and complete its transfer to the socket member, and means for then blanking out the spring containing member from the stock.

17. The combination with means for intermittently feeding a wire, of an arbor across which the wire is fed, a stripper cooperating with the arbor and having a projection thereon, means for raising and lowering said arbor, a slide provided with means for cutting the wire and partially bending it, means for reciprocating the slide and for raising and lowering its inner end, slides moving transversely to that first mentioned for further bending the wire around the arbor and against said projection on the stripper, an additional slide moving in the same direction as that first mentioned and provided with means for giving final shape to the spring, and means for reciprocating said slide towards and from the arbor.

18. In connection with the subject matter of claim 17, mechanism shown particularly in Figure 23 of the drawings for operating the front and rear slides consisting of the cam operated oscillating levers.

19. In a machine of the character described, a plurality of shaping dies adapted to engage a strip of material moved intermittently therethrough, and adapted to impart successive shaping operations to said strip, spring forming means, means for inserting the spring formed by said spring forming means into the shaped article, and means for cutting said article from the strip after insertion of the spring.

20. A machine for making the socket members of snap fasteners, comprising means for guiding and intermittently feeding the stock, and a series of sets of upper and lower dies and cutters between which the stock is fed step by step, and including dies to draw the metal from the stock to form a projection thereon, dies to gradually reduce the metal thus drawn to proper size for the socket of the member, cutters to then cut slots in said projection, dies to then form the body portion of the member without disturbing the projection, dies to then pierce thread holes in the metal, dies to then insert a wire spring in the socket member, and dies to then blank out said member.

21. A machine for making the socket members of snap fasteners comprising means for guiding and intermittently feeding the stock, and a series of sets of upper and lower dies and cutters between which the stock is fed step by step, and including dies to draw the metal from the stock to form a projection therein, dies to gradually reduce the metal thus drawn to proper size for the socket of the member, cutters to then cut slots in said projection, dies to then form the body portion of the member without disturbing the projection, dies to then pierce thread holes in the stock, dies to then give a concavo-convex form to the body portion of the member, dies to then insert a wire spring in said member, and dies to then blank it out.

22. In a die press, the combination with male and female die members one of which reciprocates perpendicular to a strip of metal fed between the same to form a boss thereon, of a pair of cutters movable parallel to said strip and adapted to cut a slot in each side of said boss, and means actuated by the reciprocation of said member to operate the cutters.

23. The combination of a die press bed having a transverse recess, a reciprocating die head co-operating therewith, a cutter bar movable in said recess in a plane parallel to the face of the bed and having cutters adapted to act on projections on work passing across said bed, and means to operate the cutter bar.

24. The combination with a pair of die members one of which reciprocates and is provided with a projection adapted to enter a boss in a piece of work between said members, to hold the same in position, of a reciprocating cutter bar having a pair of cutters movable laterally with respect to said projection, to slot opposite sides of said boss while so held.

In testimony whereof we have hereunto subscribed our names.

WILLIAM C. HUGULEY.
WILLIAM NELSON.

Witnesses as to William C. Huguley:
E. W. RHODES,
BRUCE WILLIAMS,
MERVIL MACDONALD.
Witnesses as to William Nelson:
EUGENE L. ROGER,
GEORGE J. KNELL.